(12) United States Patent
Park et al.

(10) Patent No.: US 11,800,414 B2
(45) Date of Patent: Oct. 24, 2023

(54) COMMUNICATION OF CELL CONFIGURATION PARAMETERS OF AN UNLICENSED CELL

(71) Applicant: Ofinno, LLC, Reston, VA (US)

(72) Inventors: Kyungmin Park, Vienna, VA (US); Esmael Dinan, McLean, VA (US); Alireza Babaei, Fairfax, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 17/901,156

(22) Filed: Sep. 1, 2022

(65) Prior Publication Data
US 2023/0007546 A1 Jan. 5, 2023

Related U.S. Application Data

(63) Continuation of application No. 17/111,586, filed on Dec. 4, 2020, now Pat. No. 11,438,810, which is a
(Continued)

(51) Int. Cl.
*H04W 36/00* (2009.01)
*H04W 74/08* (2009.01)
*H04L 5/00* (2006.01)
*H04L 27/00* (2006.01)
*H04W 16/14* (2009.01)
(Continued)

(52) U.S. Cl.
CPC ....... *H04W 36/0061* (2013.01); *H04L 5/0091* (2013.01); *H04L 27/0006* (2013.01); *H04W 16/14* (2013.01); *H04W 36/00835* (2018.08); *H04W 74/0808* (2013.01); *H04L 5/0051* (2013.01); *H04L 5/0053* (2013.01);
(Continued)

(58) Field of Classification Search
None
See application file for complete search history.

(56) References Cited

U.S. PATENT DOCUMENTS 8,571,555 B2 * 10/2013 Godin ............... H04W 36/02 370/332
9,560,552 B2 * 1/2017 Li ..................... H04W 36/0069
(Continued)

OTHER PUBLICATIONS

3GPP TS 36.300 V14.0.0 (Sep. 2016); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 14).
(Continued)

*Primary Examiner* — Hong S Cho
(74) *Attorney, Agent, or Firm* — Garrison Prinslow; Kavon Nasabzadeh; Philip R. Smith

(57) ABSTRACT

A first base station may receive, from a second base station, cell configuration parameters of one or more cells of the second base station. The cell configuration parameters may indicating at least one first information element (IE) indicating a first identifier of a first cell of the one or more cells, at least one second IE indicating that the first cell is an unlicensed cell, and at least one third IE indicating radio frequency channel number of the unlicensed cell. The first base station may send, to the second base station, a handover request message for a wireless device after receiving the cell configuration parameters.

20 Claims, 16 Drawing Sheets

Related U.S. Application Data continuation of application No. 16/508,261, filed on Jul. 10, 2019, now Pat. No. 10,863,396, which is a continuation of application No. 15/846,721, filed on Dec. 19, 2017, now Pat. No. 10,356,671.

(60) Provisional application No. 62/436,836, filed on Dec. 20, 2016.

(51) Int. Cl.
 H04W 74/00 (2009.01)
 H04W 72/23 (2023.01)
(52) U.S. Cl.
 CPC .......... H04W 72/23 (2023.01); H04W 74/002 (2013.01); Y02D 30/70 (2020.08)

(56) References Cited

U.S. PATENT DOCUMENTS

| | | | | |
|---|---|---|---|---|
| 2005/0197124 | A1* | 9/2005 | Kang | H04W 36/30 455/439 |
| 2006/0094431 | A1* | 5/2006 | Saifullah | H04W 36/14 455/436 |
| 2007/0047512 | A1* | 3/2007 | Zhang | H04W 36/30 370/395.2 |
| 2017/0048861 | A1* | 2/2017 | Choi | H04L 5/0053 |
| 2019/0014522 | A1* | 1/2019 | Saga | H04W 36/20 |

OTHER PUBLICATIONS

3GPP TS 36.331 V14.0.0 (Sep. 2016); 3rd Generation Partnership Project; Technical Specification Group Radio Access Network; Evolved Universal Terrestrial Radio Access (E-UTRA); Radio Resource Control (RRC); Protocol specification; (Release 14).
3GPP TS 36.423 V14.0.0 (Sep. 2016); 3rd Generation Partnership Project; Technical Specification Group Radio Access Network; Evolved Universal Terrestrial Radio Access Network (E-UTRAN); X2 application protocol (X2AP); (Release 14).
R1-1611573; 3GPP TSG-RAN Meeting #87; Reno, USA, Nov. 10-14, 2016; Change Request; 36.213 CR draft; rev 0; Current version: 14.0.0; Title: Draft CR on EPDCCH search space for LAA; Source to WG: Qualcomm Incorporated; Source to TSG: R1.
R2-169067; 3GPP TSG-RAN WG2 Meeting #96; Reno, USA Nov. 14-18, 2016; Change Request; 36.306 CR 1370; rev 1; Current version: 14.0.0; Title: Correction on simultaneous transmission of PUCCH and PUSCH for eLAA; Source to WG: Huawei, HiSilicon, Ericsson; Source to TSG: R2.
R1-1611576; 3GPP TSG RAN WG1 #87; Nov. 10-14, 2016; Revno, Nevada; Agenda item: 6.1.7; Source: Qualcomm Incorporated; Title: On UL resource allocation for 10MHz eLAA; Document for: Discussion and Decision.
R1-1611577; 3GPP TSG-RAN Meeting #87; Reno, USA, Nov. 10-14, 2016; Change Request; 36.212 CR draft; rev 0; Current version: 14.0.0; Title: Draft 212 CR on UL resource allocation for 10MHz LAA SCell; Source to WG: Qualcomm Incorporated; Source to TSG: R1.
R1-1611578; 3GPP TSG-RAN Meeting #87; Reno, USA, Nov. 10-14, 2016; Change Request; 36.213 CR draft; rev 0; Current version: 14.0.0; Title: Draft 213 CR on UL resource allocation for 10MHz LAA SCell; Source to WG: Qualcomm Incorporated; Source to TSG: R1.
R1-1611582; 3GPP TSG RAN WG1 #87; Nov. 14-28, 2016; Reno, USA; Agenda item: 6.1.7; Source: Qualcomm Incorporated; Title: Discussion on simultaneous transmission on non-LAA and LAA serving cells; Document for: Discussion and Decision.
R1-1611583; 3GPP TSG-RAN Meeting #87; Reno, USA, Nov. 10-14, 2016; Change Request; 36.213 CR draft; rev 0; Current version: 14.0.0; Title: Draft CR on SRS dropping rules for LAA; Source to WG: Qualcomm Incorporated; Source to TSG: R1.
R1-1611589; 3GPP TSG-RAN Meeting #87; Reno, USA, Nov. 10-14, 2016; Change Request; 36.213 CR draft; rev 0; Current version: 14.0.0; Title: Draft CR on UE assumptions on the minimum size of ending partial subframe for receiving UL grants; Source to WG: Qualcomm Incorporated; Source to TSG: R1.
R1-1611730; 3GPP TSG-RAN WG1 Meeting #87; Reno, USA, Nov. 14-18, 2016; Draft Change Request; 36.213 CR xxxx; rev _; Current version: 14.0.0; Title: Correction on EPDCCH candidate configuration; Source to WG: LG Electronics, Nokia, Alcatel-Lucent Shanghai Bell.
R1-1611918; 3GPP TSG-RAN WG1 Meeting #87; Reno, Nevada, USA, Nov. 14-18, 2016; Change Request; 36.213 CR 0786; rev -; Current version: 14.0.0; Title: Correction on the UL Type 1 channel access description; Source to WG: Intel Corporation; Source to TSG: RAN1.
R1-1612290; 3GPP TSG-RAN WG1 Meeting 87; Nov. 14-18, 2016, Reno, U.S.A.; Source: Panasonic; Title: UL Grant Conflict Handling; Agenda Item: 6.1.7; Document for: Discussion, Decision.
R1-1612291; 3GPP TSG-RAN WG1 Meeting 87; Nov. 14-18, 2016, Reno, U.S.A.; Source: Panasonic; Title: Maximum Usability of Two-Stage Grants; Agenda Item: 6.1.7; Document for: Discussion, Decision.
R1-1612292; 3GPP TSG-RAN WG1 Meeting #87; Reno, U.S.A., Nov. 14-18, 2016; Change Request; 36.213 CR Draft-0779; rev 1; Current version: 14.0.0; Title: CR on trigger monitoring timeline for triggered grants in eLAA; Source to WG: Panasonic.
R1-1612294; 3GPP TSG-RAN WG1 Meeting #87; Reno, U.S.A., Nov. 14-18, 2016; Change Request; 36.213 CR Draft; rev -; Current version: 14.0.0; Title: CR on validation for triggered grants in eLAA; Source to WG: Panasonic.
R1-1612384; 3GPP TSG RAN WG1 Meeting #87; Reno, USA Nov. 14-18, 2016; [Draft]Change Request; 36.213 CR; rev -; Current version: 14.0.0; Title: Correction on PDCCH candidate adjustments; Source to WG: Samsung.
R1-1612835; 3GPP TSG RAN WG1 Meeting #87; Reno, USA Nov. 14-18, 2016; Source: WILUS Inc.; Title: Discussion on CWS adjustment for UL Multi-carrier Transmission; Agenda item: 6.1.7; Document for: Discussion/Decision.
R1-1613135; 3GPP TSG-RAN Meeting #87; Reno, USA, Nov. 14-18, 2016; Change Request; 36.213 CR 803; rev -; Current version: 14.0.0; Title: Corrections to EPDCCH candidate derivation procedure for eLAA in TS36.213; Source to WG: Sharp.
R1-1613283; 3GPP TSG-RAN Meeting #87; Reno, USA, Nov. 14-18, 2016; Change Request; 36.212 CR 0234; rev -; Current version: 14.0.0; Title: Corrections to bit padding of DCI format 1A for eLAA in TS36.212; Source to WG: Sharp.
R1-1613451; 3GPP TSG-RAN WG1 Meeting #87; Reno, USA, Nov. 14-18, 2016; Draft Change Request; 36.213 CR xxxx; rev _; Current version: 14.0.0; Title: Correction on continuous transmission after the successful LBT; Source to WG: LG Electronics, WILUS.
R1-1613482; 3GPP TSG-RAN Meeting #87; Reno, USA, Nov. 10-14, 2016; Change Request; 36.213 CR 0815; rev 0; Current version: 14.0.0; Title: CR on using 25us LBT for UEs on carriers without eNB Cat 4 LBT; Source to WG: Qualcomm Incorporated, Ericsson, Nokia, Broadcom, Wilus; Source to TSG: R1.
R1-1613483; 3GPP TSG-RAN Meeting #87; Reno, USA, Nov. 10-14, 2016; Change Request; 36.213 CR 0816; rev 0; Current version: 14.0.0; Title: CR on UL resource allocation for 10MHz LAA SCell; Source to WG: Qualcomm Incorporated; Source to TSG: R1.
R1-1613485; 3GPP TSG-RAN Meeting #87; Reno, USA, Nov. 14-18, 2016; Change Request; 36.212 CR 0236; rev -; Current version: 14.0.0; Title: Corrections to bit padding of DCI format 0B for eLAA in TS36.212; Source to WG: Sharp, Nokia.
R1-1613486; 3GPP TSG-RAN WG1 Meeting #87; Reno, U.S.A., Nov. 14-18, 2016; Change Request; 36.213 CR 0813; rev -; Current version: 14.0.0; Title: Draft CR on the UE assumption on multiple UL grants indicating a same subframe.
R1-1613506; 3GPP TSG-RAN Meeting #87; Reno, USA, Nov. 10-14, 2016; Change Request; 36.213 CR 0811; rev 0; Current

(56) References Cited

OTHER PUBLICATIONS version: 14.0.0; Title: CR on MCOT limits for carriers on which eNB performs Type B LBT; Source to WG: Qualcomm Incorporated; Source to TSG: R1.
R1-1613509; 3GPP TSG-RAN WG1 Meeting #87; Reno, U.S.A., Nov. 14-18, 2016; Change Request; 36.213 CR 0779; rev 1; Current version: 14.0.0; Title: CR on trigger monitoring timeline for triggered grants in eLAA; Source to WG: Panasonic, Qualcomm Incorporated.
R1-1613510; 3GPP TSG-RAN Meeting #87; Reno, Nevada, USA, Nov. 14-18, 2016; Change Request; 36.213 CR 802; rev 1; Current version: 14 0.0; Title: CR on Multi-carrier LBT for Uplink Transmission; Source to WG: Ericsson.
R1-1613766; 3GPP TSG-RAN WG1 Meeting #87; Reno, USA, Nov. 14-18, 2016; Change Request; 36.213 CR 0821; rev _; Current version: 14.0.0; Title: Correction on EPDCCH candidate configuration; Source to WG: LG Electronics, Nokia, Alcatel-Lucent Shanghai Bell; Source to TSG: RAN1.
R2-167557; 3GPP TSG-RAN WG2 Meeting #96; Reno, USA, Nov. 14-18, 2016; Change Request; 36.331 CR 2378; rev; Current version: 14.0.0; Title: Miscellaneous corrections to eLAA; Source to WG: Intel Corporation; Source to TSG: R2.
R2-167606; 3GPP TSG-RAN WG2 Meeting #96; Reno, USA Nov. 14-18, 2016; Change Request; 36.300 CR 0926; rev -; Current version: 14.0.0; Title: Correction on cross carrier scheduling for eLAA; Source to WG: Huawei, HiSilicon; Source to TSG: R2.
R2-167607; 3GPP TSG-RAN WG2 Meeting #96; Reno, USA Nov. 14-18, 2016; Change Request; 36.300 CR 0927; rev-; Current version: 14.0.0; Title: Correction on LBT for eLAA; Source to WG: Huawei, HiSilicon, Blackberry, Ericsson; Source to TSG: R2.
R2-167693; 3GPP TSG-RAN WG2 Meeting #96; Reno, USA, Nov. 14-18, 2016; Source: Huawei, HiSilicon; Title: BSR for Two-stage scheduling; Document for: Discussion and Decision.
R2-168362; 3GPP TSG-RAN WG2 #96; Reno, Nevada, USA, Nov. 14-18, 2016; Agenda Item: 8.1.2; Source: Ericsson; Title: Report from [95bis#07][LTE/eLAA] MAC impact of 2 step granting; Document for: Discussion, Decision.
R2-168363; 3GPP TSG-RAN WG2 Meeting #96; Reno, Nevada, USA, Nov. 14-18, 2016; Change Request; 36.321 CR 0963; rev -; Current version: 14.0.0; Title: Monitoring of PUSCH trigger B while not in Active Time.
R2-168364; 3GPP TSG-RAN WG2 Meeting #96; Reno, Nevada, USA, Nov. 14-18, 2016; Change Request; 36.321 CR 0964; rev -; Current version: 14.0.0; Title: Clarification of PUSCH trigger B reception and nactivity timer starting; Source to WG: Ericsson; Source to TSG: R2.
R2-168444; 3GPP TSG-RAN2 Meeting #96; US, Reno, Nevada, Nov. 14-18, 2016; Agenda Item: 8.1.2—Enhanced LAA for LTE: User plane; Source: ASUSTeK; Title: The operation of UL HARQ RTT Timer for UL LAA; Document for: Discussion.
R2-168543; 3GPP TSG-RAN WG2 Meeting #96; Reno, USA, Nov. 14-18, 2016; Change Request; 36.321 CR 0970; rev -; Current version: 14.0.0; Title: Type2 PHR for eLAA; Source to WG: Nokia, Alcatel-Lucent Shanghai Bell, Huawei, HiSilicon, Samsung; Source to TSG: R2.
R2-168571; 3GPP TSG-RAN WG2 Meeting #96; Reno, USA, Nov. 14-18, 2016; Change Request; 36.321 CR 0971; rev -; Current version: 14.0.0; Title: 2-step scheduling and multi subframe scheduling for eLAA; Source to WG: Nokia, Alcatel-Lucent Shanghai Bell; Source to TSG: R2.
R2-168697; 3GPP TSG-RAN2 Meeting #96; Reno, NV, USA, Nov. 14-18, 2016; Change Request; 36.321 CR 2515; rev -; Current version: 14.0.0; Title: HARQ RTT Timer for UL MIMO; Source to WG: Qualcomm Incorporated; Source to TSG: R2.
R2-168875; 3GPP TSG-RAN2 Meeting #96; Reno, NV, USA, Nov. 14-18, 2016; Change Request; 36.321 CR 0988; rev -; Current version: 14.0.0; Title: HARQ RTT Timer for UL MIMO; Source WG: Qualcomm Incorporated; Source to TSG: R2.
R2-168958; 3GPP TSG-RAN WG2 Meeting #96; Reno, Nevada, USA, Nov. 14-18, 2016; Change Request; 36.306 CR 1397; rev -; Current version: 14.0.0; Title: Introduction of capabilities for eLAA; Source to WG: Ericsson, Broadcom; Source to TSG: R2.
R2-169064; 3GPP TSG-RAN WG2 Meeting #96; Reno, Nevada, USA, Nov. 14-18, 2016; Change Request; 36.321 CR 0962; rev 1; Current version: 14.0.0; Title: PDCCH-subframe definition for LAA; Source to WG: Ericsson; Source to TSG: R2.
R2-169065; 3GPP TSG-RAN WG2 Meeting #96; Reno, Nevada, USA, Nov. 14-18, 2016; Change Request; 36.321 CR 0963; rev 1; Current version: 14.0.0; Title: Monitoring of PUSCH trigger B while not in Active Time; Source to WG: Ericsson; Source to TSG: R2.
R2-169127; 3GPP TSG-RAN WG2 Meeting #96; Reno, Nevada, USA, Nov. 14-18, 2016; Change Request; 36.331 CR 2548; rev 2; Current version: 14.0.0; Title: Introduction of capabilities for eLAA; Source to WG: Ericsson, Broadcom; Source to TSG: R2.

\* cited by examiner

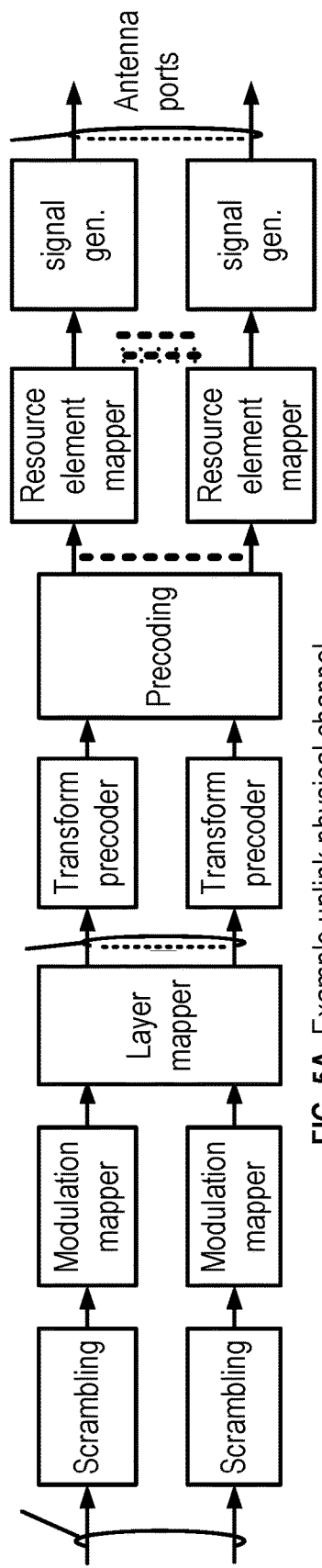
FIG. 5A Example uplink physical channel
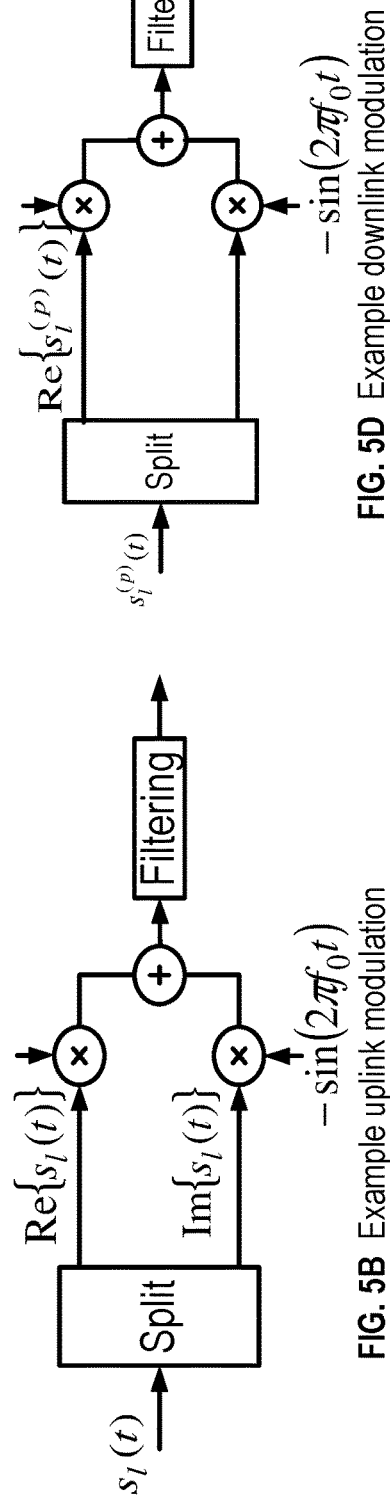
FIG. 5B Example uplink modulation
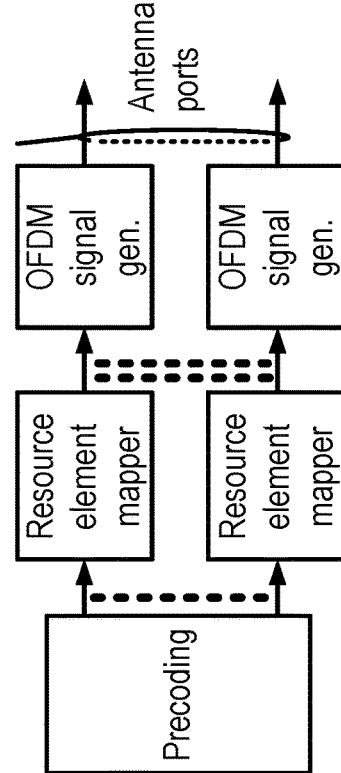
FIG. 5D Example downlink modulation
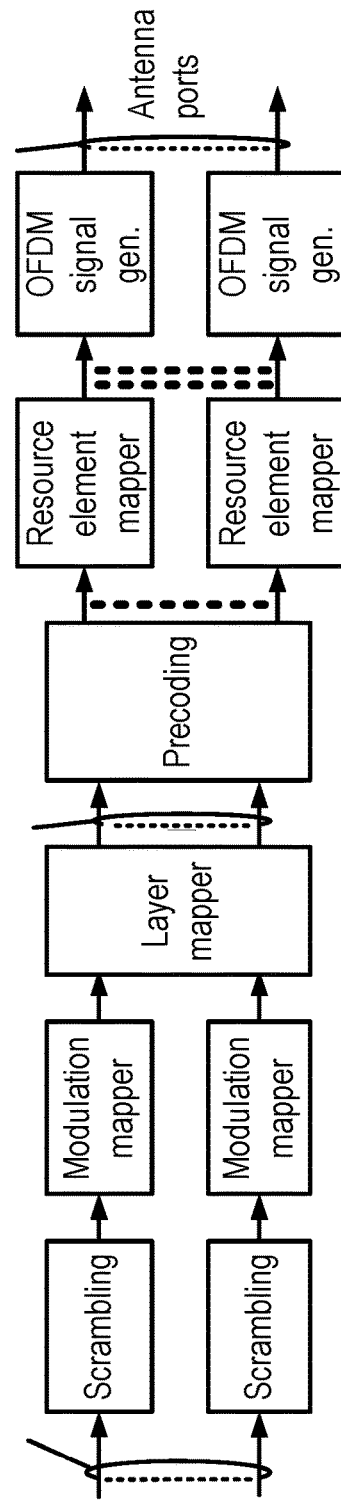
FIG. 5C Example downlink physical channel Dual-Connectivity at eNB Example 1: 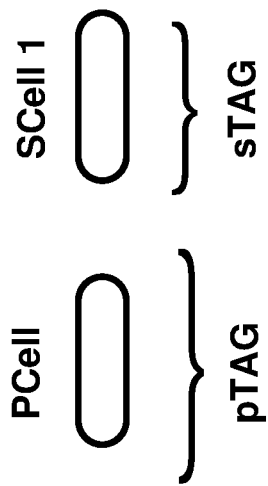
Example 2: 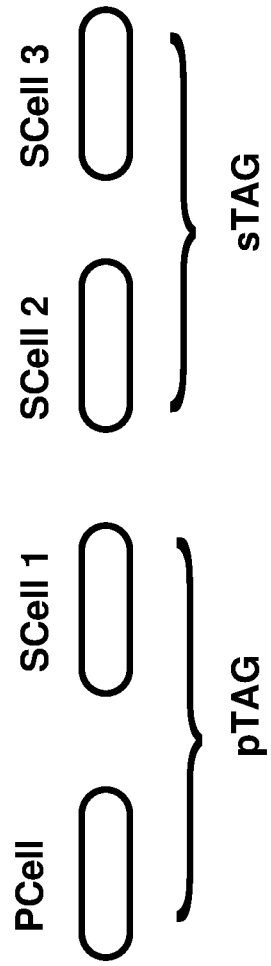
Example 3: 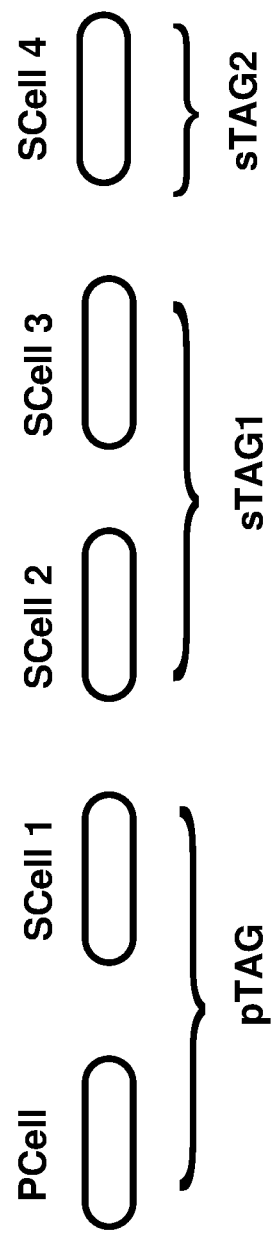
FIG. 8

```
┌─────────────────────────────────────────────────┐
│ Transmit, by a 1st base station from a 2nd base │
│ station, cell configuration parameters of       │
│ cell(s) of the 1st base station, the cell       │
│ configuration parameters comprising: 1st IE(s)  │
│ indicating a 1st identifier of a 1st cell of    │
│ the cell(s); 2nd IE(s) indicating that the 1st  │
│ cell is a LAA cell; and 3rd IE(s) indicating    │
│ configuration parameter(s) of frame structure   │
│ Type 3 of the LAA cell                          │
│                       1610                      │
└─────────────────────────────────────────────────┘
                         │
                         ▼
┌─────────────────────────────────────────────────┐
│ Receive, by the 1st base station to the 2nd     │
│ base station, a handover request message for    │
│ the 1st wireless device, the handover request   │
│ message configured based on the configuration   │
│ parameter(s) of frame structure Type 3 of the   │
│ LAA cell                                        │
│                       1620                      │
└─────────────────────────────────────────────────┘
```

FIG. 16

COMMUNICATION OF CELL CONFIGURATION PARAMETERS OF AN UNLICENSED CELL

CROSS-REFERENCE TO RELATED APPLICATIONS

This application is a continuation of U.S. patent application Ser. No. 17/111,586, filed Dec. 4, 2020, which is a continuation of U.S. patent application Ser. No. 16/508,261, filed Jul. 10, 2019, which is a continuation of U.S. patent application Ser. No. 15/846,721, filed Dec. 19, 2017, which claims the benefit of U.S. Provisional Application No. 62/436,836, filed Dec. 20, 2016, all of which are hereby incorporated by reference in their entireties.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

FIG. 16 is a flow diagram of an aspect of an embodiment of the present disclosure.

DETAILED DESCRIPTION OF EMBODIMENTS

Figure 1:
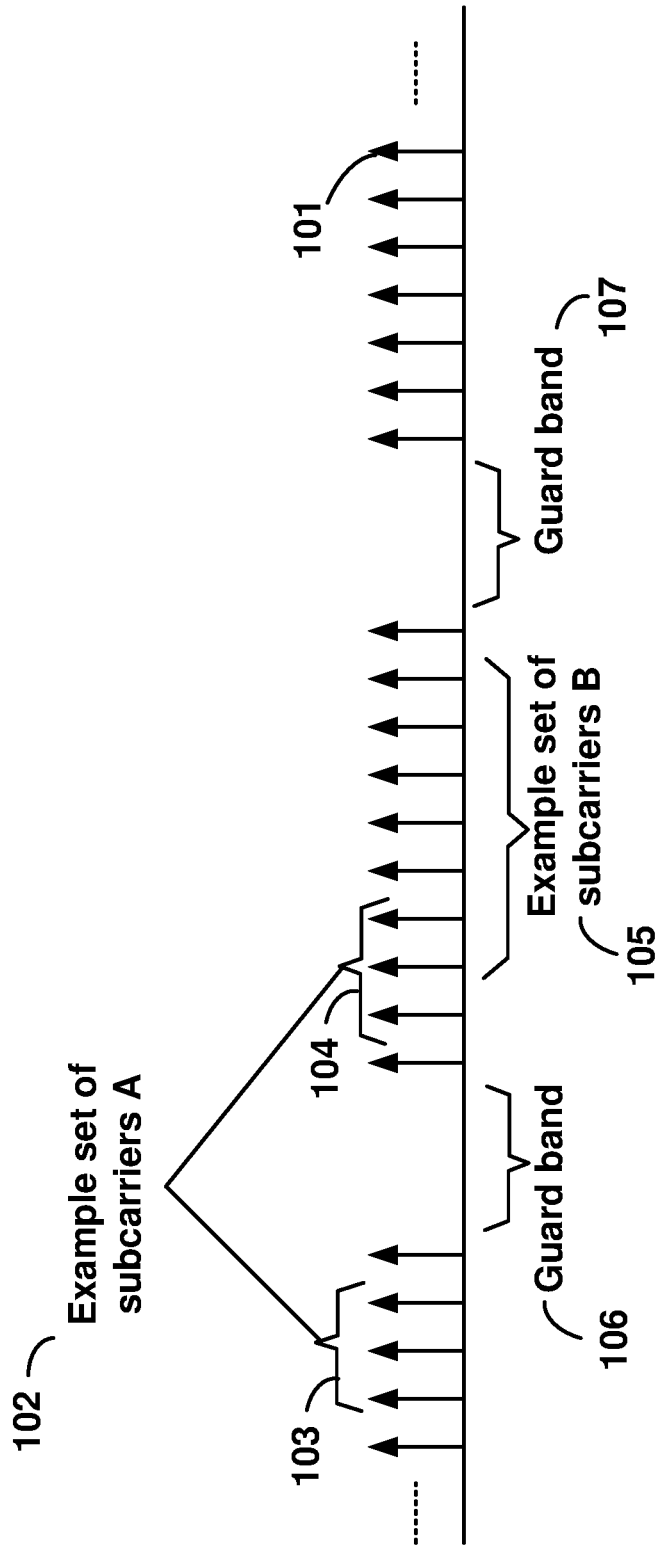
FIG. 1 is a diagram depicting example sets of OFDM subcarriers as per an aspect of an embodiment of the present disclosure.

Example embodiments of the present invention enable operation of carrier aggregation. Embodiments of the technology disclosed herein may be employed in the technical field of multicarrier communication systems. More particularly, the embodiments of the technology disclosed herein may relate to signal timing in multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer TDD time division duplexing
TDMA time division multiple access
TA timing advance
TAG timing advance group
TB transport block
UL uplink
UE user equipment
VHDL VHSIC hardware description language Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
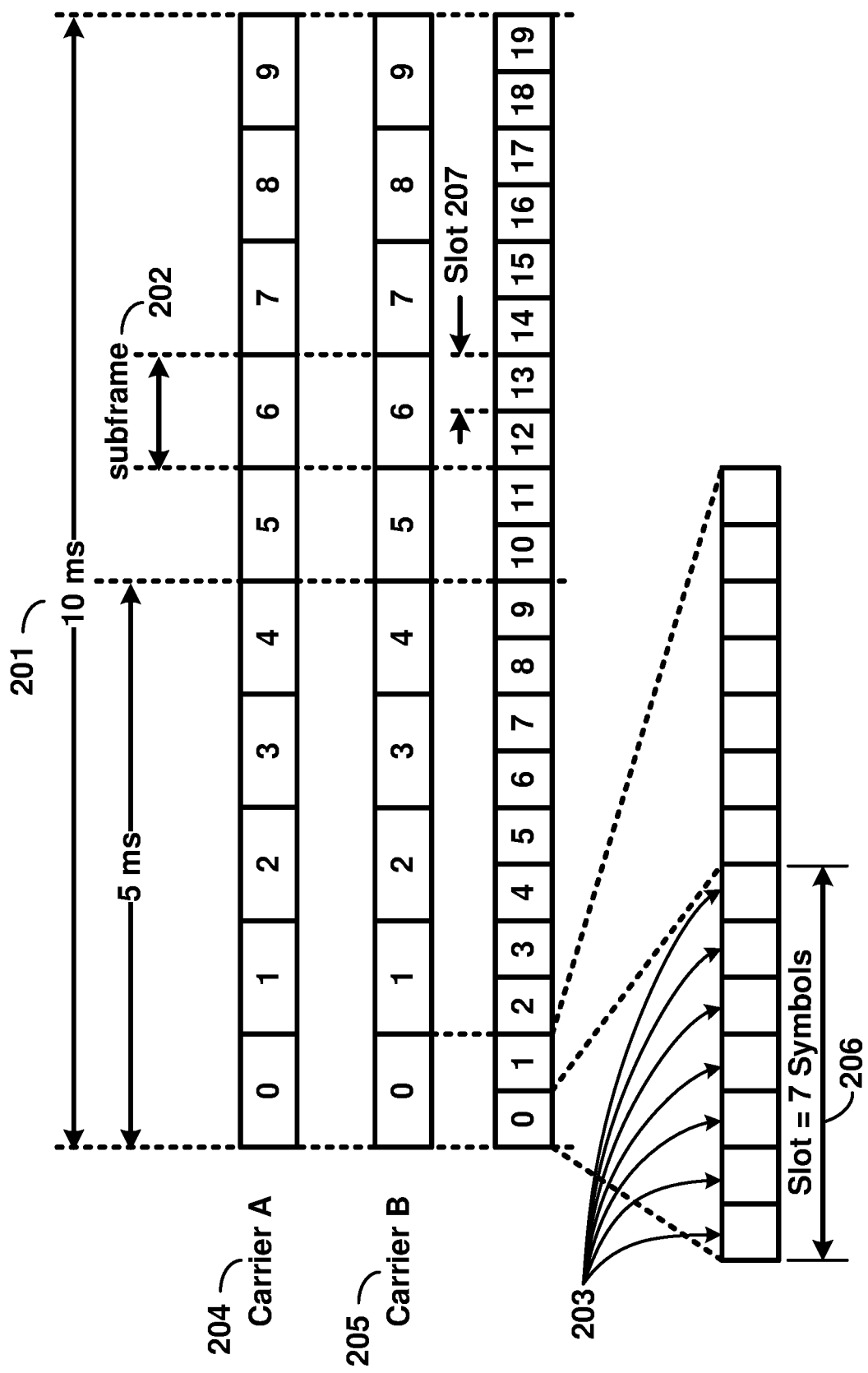
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
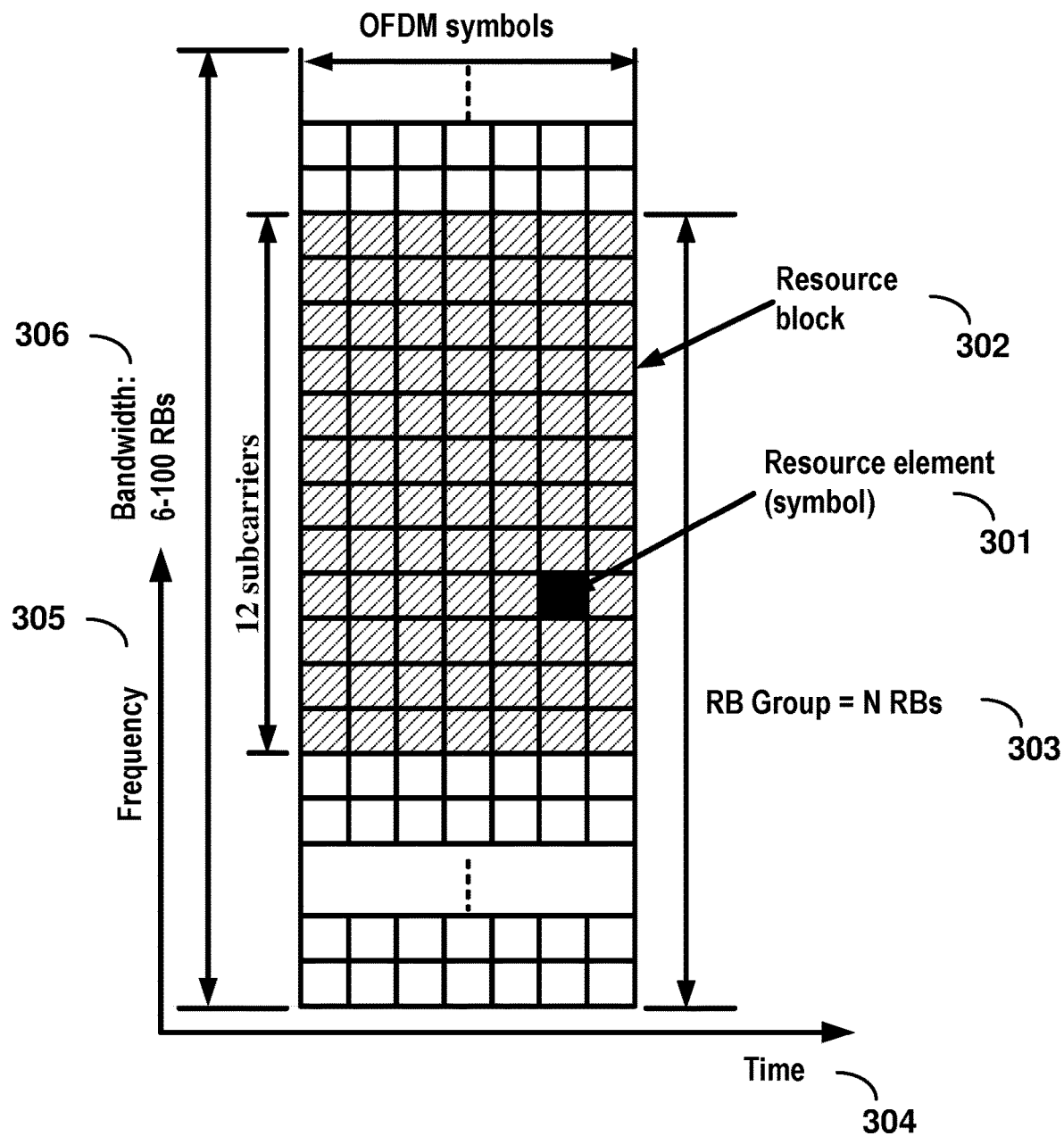
FIG. 3 is a diagram depicting OFDM radio resources as per an aspect of an embodiment of the present disclosure.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
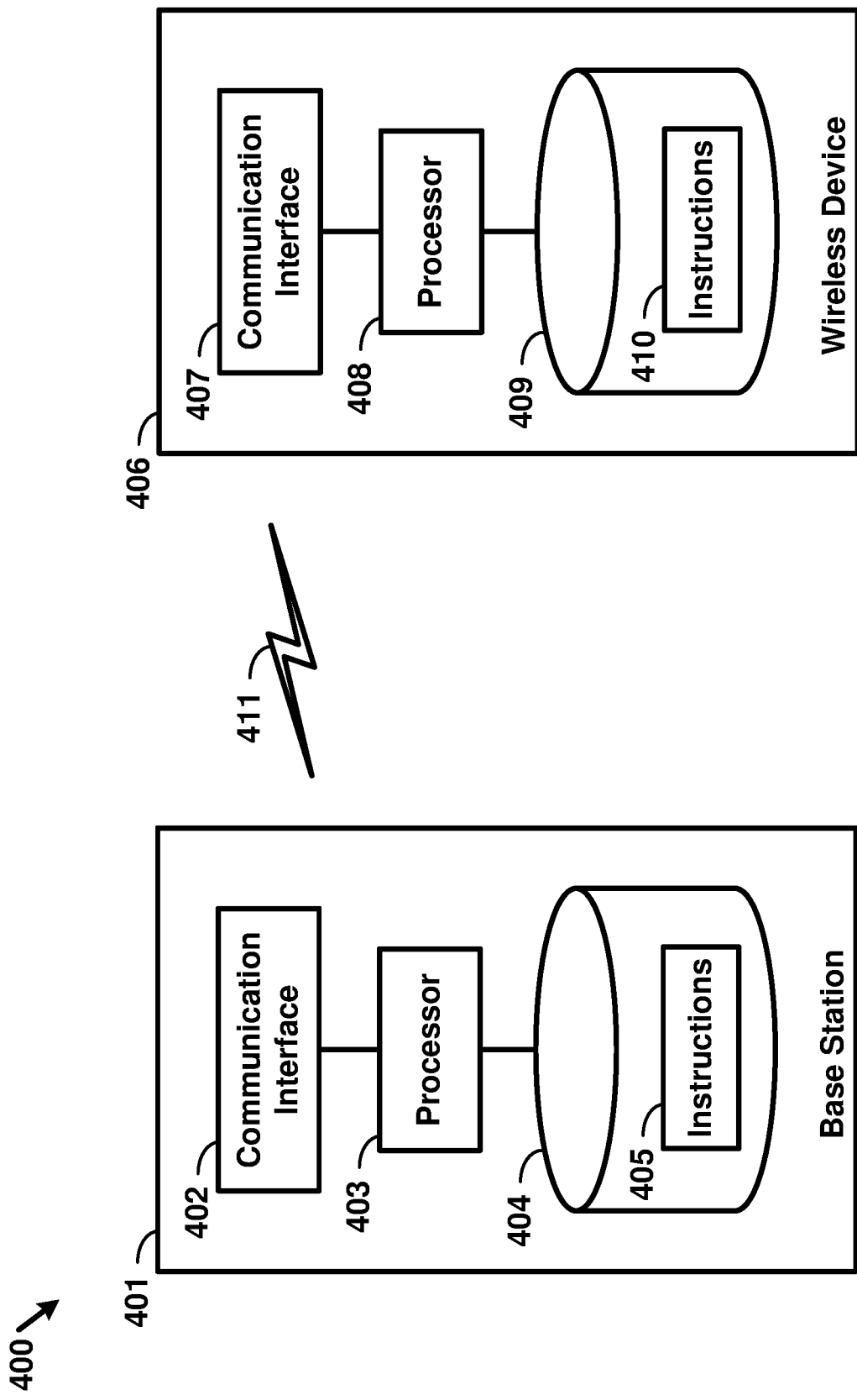
FIG. 4 is a block diagram of a base station and a wireless device as per an aspect of an embodiment of the present disclosure.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may include a multitude of base stations, providing a user plane PDCP/RLC/MAC/PHY and control plane (RRC) protocol terminations towards the wireless device. The base station(s) may be interconnected with other base station(s) (e.g. employing an X2 interface). The base stations may also be connected employing, for example, an S1 interface to an EPC. For example, the base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
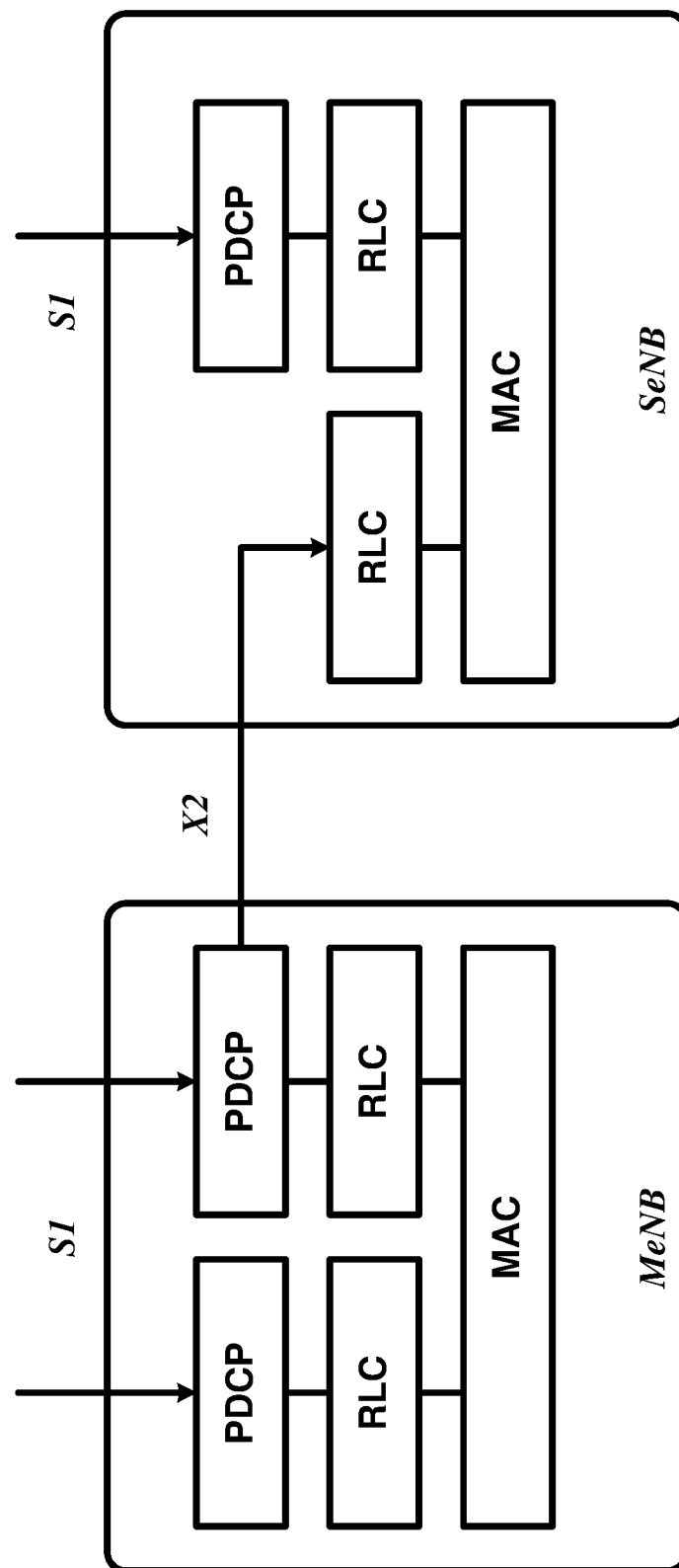
FIG. 6 is an example diagram for a protocol structure with CA and DC as per an aspect of an embodiment of the present disclosure.
Figure 7:
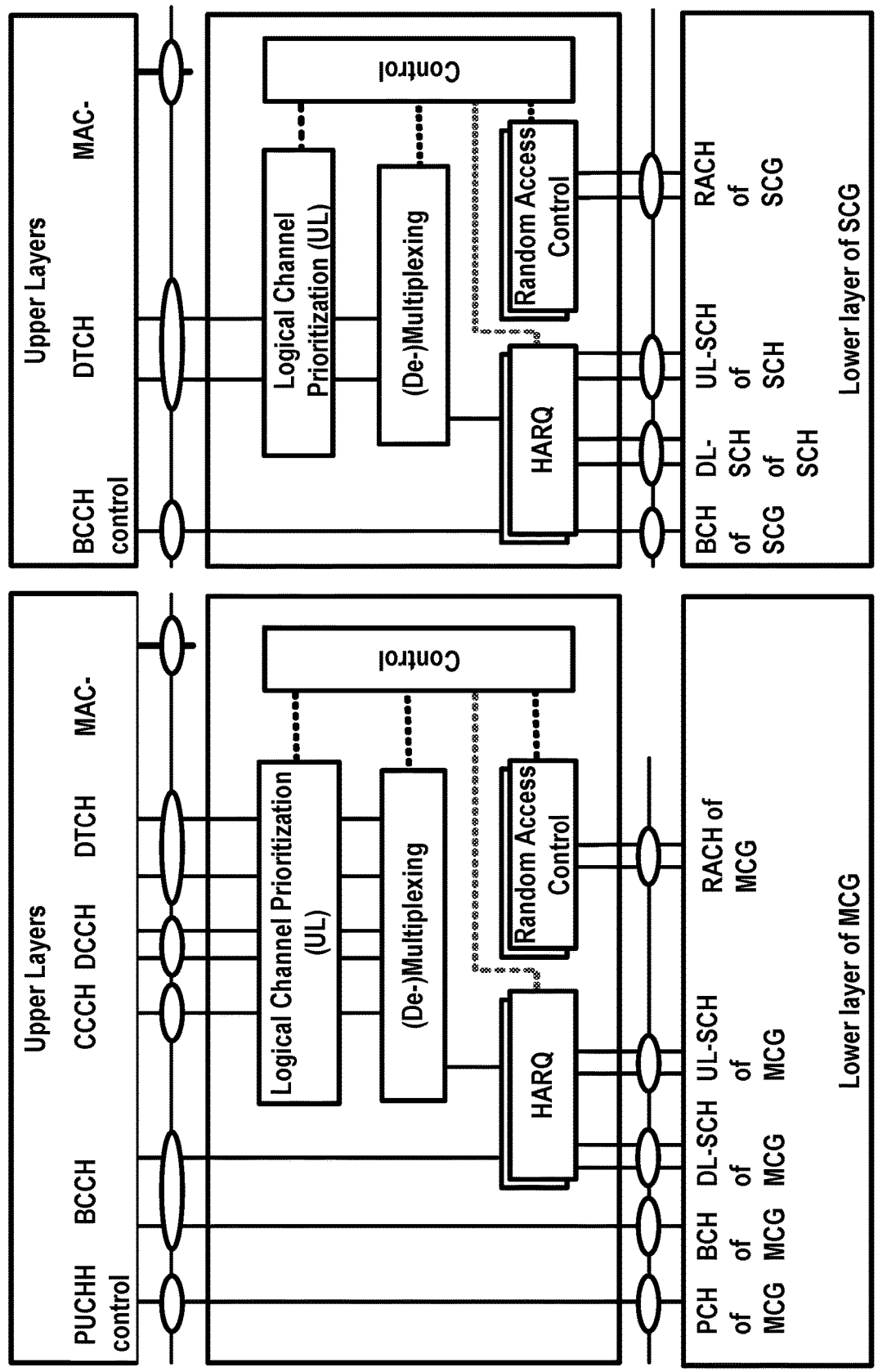
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present invention. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the invention.

In the case of DC, the UE may be configured with two MAC entities: one MAC entity for MeNB, and one MAC entity for SeNB. In DC, the configured set of serving cells for a UE may comprise of two subsets: the Master Cell Group (MCG) containing the serving cells of the MeNB, and the Secondary Cell Group (SCG) containing the serving cells of the SeNB. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a MeNB may be informed by the UE of a SCG failure type, for split bearer, the DL data transfer over the MeNB is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a MeNB and a SeNB, one or more of the following principles may be applied: the MeNB may maintain the RRM measurement configuration of the UE and may, (e.g., based on received measurement reports or traffic conditions or bearer types), decide to ask a SeNB to provide additional resources (serving cells) for a UE; upon receiving a request from the MeNB, a SeNB may create a container that may result in the configuration of additional serving cells for the UE (or decide that it has no resource available to do so); for UE capability coordination, the MeNB may provide (part of) the AS configuration and the UE capabilities to the SeNB; the MeNB and the SeNB may exchange information about a UE configuration by employing of RRC containers (inter-node messages) carried in X2 messages; the SeNB may initiate a reconfiguration of its existing serving cells (e.g., PUCCH towards the SeNB); the SeNB may decide which cell is the PSCell within the SCG; the MeNB may not change the content of the RRC configuration provided by the SeNB; in the case of a SCG addition and a SCG SCell addition, the MeNB may provide the latest measurement results for the SCG cell(s); both a MeNB and a SeNB may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
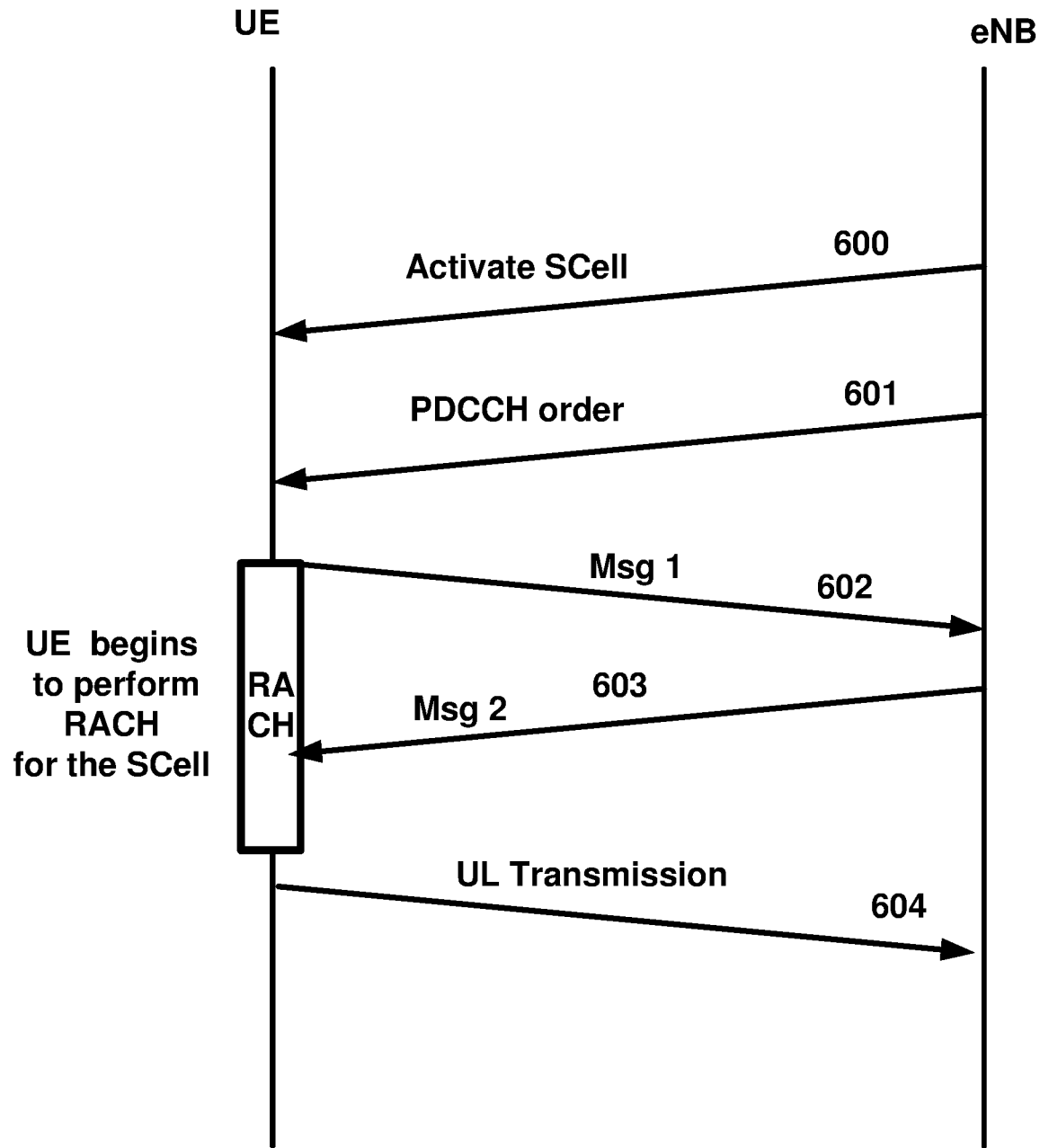
FIG. 9 is an example message flow in a random access process in a secondary TAG as per an aspect of an embodiment of the present disclosure.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing, and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

The amount of data traffic carried over cellular networks is expected to increase for many years to come. The number of users/devices is increasing, and a user/device accesses an increasing number and variety of services, e.g. video delivery, large files, images. This may require high capacity in the network, and may provision high data rates to meet customers' expectations on interactivity and responsiveness. More spectrum is therefore needed for cellular operators to meet the increasing demand. Considering user expectations of high data rates along with seamless mobility, it may be beneficial that more spectrum be made available for deploying macro cells as well as small cells for wireless systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be implemented. Some of these functions may be implemented by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be implemented by one or more signals for LAA operation with discontinuous downlink transmission may include one or more of the following: detection of the LAA downlink transmission (e.g. including cell identification) by UEs; and/or time & frequency synchronization of UEs.

Frame structure type 3 may be applicable to an LAA cell operation e.g. with normal cyclic prefix. In an example, a radio frame may be $T\_f=307200*T\_s=10$ ms long and include 20 slots of length $T\_slot=15360*T\_s=0.5$ ms, numbered from 0 to 19. A subframe may comprise two consecutive slots where subframe i comprises of slots 2i and 2i+1. The 10 subframes within a radio frame are available for downlink and/or uplink transmissions. Downlink transmissions may occupy one or more consecutive subframes, starting within a subframe and ending with the last subframe either fully occupied or following one of the DwPTS durations implemented in frame structure 2 (TDD). Uplink transmissions may occupy one or more consecutive subframes.

In an example, carrier aggregation including at least one cell operating in the unlicensed spectrum may be to referred to as Licensed-Assisted Access (LAA). In LAA, the configured set of serving cells for a UE may include at least one SCell operating in the unlicensed spectrum according to Frame Structure 3, (e.g. LAA SCell).

In an example, LAA eNB and UE may apply Listen-Before-Talk (LBT) before performing a transmission on LAA SCell. When LBT is applied, the transmitter listens to/senses the channel to determine whether the channel is free or busy. If the channel is determined to be free, the transmitter may perform the transmission; otherwise, it does not perform the transmission. If an LAA eNB uses channel access signals of other technologies for the purpose of LAA channel access, it may continue to meet the LAA maximum energy detection threshold requirement. Which LBT type (e.g. Cat.4 LBT or 25 microseconds LBT) the UE applies may be signalled via uplink grant for uplink PUSCH transmission on LAA SCells.

In an example, for LAA, four Channel Access Priority Classes may be defined which may be used when performing uplink and downlink transmissions in LAA carriers. A pre-defined channel Access priority class may be used by traffic belonging to the different QCIs. The eNB may configure whether the data of a logical channel may be transferred via LAA SCells or not. For transmissions on serving cells operating according to Frame Structure Type 3, the MAC entity may consider logical channels for which laa-Allowed (e.g. in an RRC message) has been configured. The physical layer may perform a listen-before-talk procedure, according to which transmissions are not performed if the channel is identified as being occupied. In this case a MAC entity may consider the transmission to have been performed anyway.

In an example embodiment, DL LAA design may employ subframe boundary alignment according to LTE-A carrier aggregation timing relationships across serving cells aggregated by CA. This may not imply that the eNB transmissions may start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. An example LBT procedure may have the following procedure. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst may be defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

In an example, DCI format 1C may be used for LAA common information. The following information is transmitted by means of the DCI format 1C: Subframe configuration for LAA (e.g. 4 bits), Uplink transmission duration and offset indication (e.g. 5 bits), PUSCH trigger B (e.g. 1 bit), reserved information bits.

DCI format 0A may be used for the scheduling of PUSCH in a LAA SCell. The following information may be transmitted by means of the DCI format 0A: Carrier indicator (e.g. 0 or 3 bits). Flag for format0A/format1A differentiation (e.g. 1 bit, where value 0 indicates format 0A and value 1 indicates format 1A.), PUSCH trigger A (e.g. 1 bit, where value 0 indicates non-triggered scheduling and value 1 indicates triggered scheduling), Timing offset (e.g. 4 bits, When the flag for triggered scheduling is set to 0, The field indicates the absolute timing offset for the PUSCH transmission. Otherwise, The first two bits of the field indicate the relative timing offset for the PUSCH transmission. The last two bits of the field indicate the time window within which the scheduling of PUSCH via triggered scheduling is valid.), resource block assignment (e.g. 6 bits provide the resource allocation in the UL subframe), Modulation and coding scheme (e.g. 5 bits), HARQ process number (e.g. 4 bits), New data indicator (e.g. 1 bit), Redundancy version (e.g. 2 bits), TPC command for scheduled PUSCH (e.g. 2 bits), Cyclic shift for DM RS and OCC index (e.g. 3 bits), CSI request (e.g. 1, 2 or 3 bits), SRS request (e.g. 1 bit), PUSCH starting position (e.g. 2 bits, 00: symbol 0, 01: 25 µs in symbol 0, 10: (25+TA) µs in symbol 0, 11: symbol 1), PUSCH ending symbol (1 bit, where value 0 indicates the last symbol of the subframe and value 1 indicates the second to last symbol of the subframe.), Channel Access type (e.g. 1 bit), Channel Access Priority Class (e.g. 2 bits), and/or other fields.

DCI format 0B may be used for the scheduling of PUSCH in each of multiple subframes in a LAA SCell. The following information is transmitted by means of the DCI format 0B: Carrier indicator (e.g. 0 or 3 bits), PUSCH trigger A (e.g. 1 bit, where value 0 indicates non-triggered scheduling and value 1 indicates triggered scheduling), Timing offset (e.g. 4 bits, when the flag for triggered scheduling is set to 0, the field indicates the absolute timing offset for the PUSCH transmission. Otherwise, The first two bits of the field indicate the relative timing offset for the PUSCH transmission. The last two bits of the field indicate the time window within which the scheduling of PUSCH via triggered scheduling is valid.), Number of scheduled subframes (e.g. 1 or 2 bits. The 1-bit field applies when maxNumberOfSchedSubframes-Format0B is configured by higher layers to two, otherwise the 2-bit field applies.), Resource block assignment (e.g. 6 bits provide the resource allocation in the UL subframe), Modulation and coding scheme (e.g. 5 bits), HARQ process number (e.g. 4 bits. The 4-bit applies to the first scheduled subframe, and the HARQ process numbers for other scheduled subframes are sequentially incremented module max HARQ ID), New data indicator (e.g. maxNumberOfSchedSubframes-Format0B-r14 bits. Each scheduled PUSCH may correspond to 1 bit.), Redundancy version (e.g. maxNumberOfSchedSubframes-Format0B bits. Each scheduled PUSCH corresponds to 1 bit), TPC command for scheduled PUSCH (e.g. 2 bits), Cyclic shift for DM RS and OCC index (e.g. 3 bits), CSI request (e.g. 1, 2 or 3 bits), SRS request (e.g. 2 bits), PUSCH starting position (e.g. 2 bits as defined for DCI format 0A), PUSCH ending symbol (e.g. 1 bit, where value 0 indicates the last symbol of the last scheduled subframe and value 1 indicates the second last symbol of the last scheduled subframe.), Channel Access type (e.g. 1 bit), Channel Access Priority Class (e.g. 2 bits), and/or other parameters.

DCI format 4A may be used for the scheduling of PUSCH in a LAA SCell with multi-antenna port transmission mode. DCI format 4B may be used for the scheduling of PUSCH with multi-antenna port transmission mode in each of multiple subframes in a LAA SCell.

In an example embodiment, DCI 0A/4A/0B/4B may include a bit to indicate whether the UL grant is a triggered grant or not. If it is a triggered grant, the UE may transmit after receiving a 1 bit trigger in the PDCCH DCI scrambled with CC-RNTI in a subframe received after the subframe carrying the UL grant. The timing between the 2nd trigger transmitted in subframe N and an earliest UL transmission may be a UE capability, if the earliest UL transmission is before subframe N+4 (UE capability signaling between transmission in subframe N+1 and N+2 and N+3).

In an example embodiment, the 4 bit field 'SF timing' in DCI format 0A/4A/0B/4B for the triggered grant may be used as follows: When the UE may transmit after reception of the trigger is signaled to the UE. 2 bits may be used to indicate X. When a UE receives a trigger in subframe N, the UE may be allowed to start transmission in subframe N+X+Y. X={0,1,2,3} indicated reusing two bits in the DCI. Y may be given by the UL burst offset in the C-PDCCH DCI scrambled by CC-RNTI (e.g. in the same subframe where the trigger is transmitted). The UE may receive signaling in the first DCI 0A/4A/0B/4B grant indicating the number of subframes after which the grant becomes invalid reusing 2 bits. The initial grant may become invalid if M ms after the initial grant, no valid trigger has been received. 2 bit: M={8,12,16,20}. UE may follow the LBT type indicated by the UL grant. An eNB may signal in the uplink grant LBT type at least including 25 us single slot LBT and Cat4 LBT to the UE at least for PUSCH.

In an example embodiment, C(common)-PDCCH may indicate a pair of values (UL burst duration, offset). UL burst duration may be a number of consecutive UL subframes belonging to the same channel occupancy, with the DL subframes in the same channel occupancy signaling the UL burst duration. Offset may be the number of subframes to the start of indicated UL burst from the start of the subframe carrying the C-PDCCH.

In an example embodiment, an LBT procedure for any UL subframe from the subframe in which C-PDCCH was received up to and including subframes until the end of the signaled UL burst duration, for which the eNB had already indicated to perform Category 4 LBT, may be switched to an LBT based on 25 us CCA. In an example, a UE may not switch to 25 us CCA if part of a set of contiguously scheduled subframes without gap appears in the UL burst indication. The UE may not be required to receive any DL signals/channels in a subframe indicated to be a UL subframe on the carrier. 5 bits to indicate combinations of offset and burst duration. The code points include {offset, duration} combinations as follows: combinations of {{1, 2, 3, 4, 6}, {1, 2, 3, 4, 5, 6}}, Reserved, no signaling of burst and offset. The format of the bits may be defined according to a pre-defined table.

In an example embodiment, resource allocation field in DCI 0A/4A/0B/4B may be 6 bits. The 64 code points indicated by the 6 bits may include the legacy RIV for contiguous interlace allocation except the code points for the allocation of 7 contiguous interlaces (70 PRBs). This set of code points may include 51 values. Additional code points may be defined for allocation of interlaces as follows: 0,1,5,6; 2,3,4,7,8,9; 0, 5; 1, 6; 2, 7; 3, 8; 4, 9; 1, 2, 3, 4, 6, 7, 8, 9. Remaining code points may be reserved.

A UE may Support UL/DL Scheduling Combinations: Self-scheduling on DL and cross-carrier scheduling on UL. The UE to monitor for DCI formats scheduling PUSCH of a single eLAA Scell on one UL licensed-band scheduling cell, e.g. DCI formats 0A/0B, Formats 4A/4B (e.g. if configured for TM2). The UE may monitor for DCI formats scheduling LAA PDSCH on the LAA SCell, e.g. DCI formats 1A/1B/1D/1/2A/2/2B/2C/2D. In an example, the RRC signaling and cross carrier scheduling may be enhanced. RRC signaling may configure self-scheduling for DL and cross-carrier scheduling for UL, for example for an LAA cell. For example, a parameter in the cross-carrier scheduling configuration parameters may indicate whether the cross carrier scheduling is for both downlink scheduling and uplink scheduling or is only for uplink scheduling (and DL is self-scheduled). In an example, a licensed cell may be configured for cross-carrier scheduling an unlicensed (e.g. LAA) cell.

For eLAA PUSCH transmission, one interlace may be the basic unit of resource allocation, which may be composed of 10 RBs for 20 MHz. The 10 RBs may be spaced equally in frequency domain for 20 MHz. In an example for 20 MHz eLAA SCell: interlace 0 is composed of RBs 0,10,20, . . . ,90. A UE may be assigned one or more interlaces. The number of RBs used for transmission may be a multiple of 2,3 and 5.

In an example, One interlace may be composed of 10 RB/interlace for 10 MHz. In an example, if the UE fails to complete Cat. 4 LBT for the first subframe in a multi-subframe UL grant, it may continue the Cat. 4 LBT procedure and attempt transmission for subsequent subframes. In an example embodiment, for enabling the start times within the first DFTS-OFDM symbol, a longer cyclic prefix for the next DFTS-OFDM symbol to occupy part of the first DFTS-OFDM symbol may be used. The UE may not be expected to start a new transmission subject to LBT earlier than 1 DFTS-OFDM symbol after the end of the previous transmission by the UE.

For eLAA, flexible timing between UL grant and UL transmission may be supported. For UL grant(s) for a UE in a subframe enabling PUSCH transmission for the UE in multiple subframes in LAA SCell, at least some of the following options are considered: 1) Single UL grant in a subframe for a UE may schedule N (N≥1) PUSCH transmissions for the UE in N subframes with single PUSCH per subframe. N is consecutive or non-consecutive. 2) Single UL grant in a subframe for a UE may schedule single PUSCH transmission in a single subframe while UE may receive multiple UL grants in a subframe for PUSCH transmissions in different subframes. 3) Single UL grant in a subframe for a UE may enable the UE to transmit single PUSCH transmission among one of the multiple subframes depending on UL LBT result. In an example embodiment, for UL transmission in eLAA Scells, flexible timing between the subframe carrying the UL grant and subframe(s) of the corresponding PUSCH(s) may be implemented. In enhanced LAA, UL grant(s) for a UE in a subframe may enable PUSCH transmission for the UE in multiple subframes in LAA SCell for both cross-cc scheduling case and self-scheduling case.

In an example embodiment, DCI format(s) may have the following scheduling information types: Type A: common to the scheduled subframes (appearing only once in a DCI), carrier indicator, resource assignment, Cyclic shift for DM RS and OCC index. Type B: subframe specific information (appearing N times for N subframes scheduling), RV, and NDI.

In an example, DCI format 0B/4B may indicates number of consecutive scheduled subframes. DCI format 0B/4B indicates HARQ process IDs for the scheduled subframes by indicating HARQ process ID for a starting subframe, and HARQ p_ids for other subframes are derived by a given rule. the HARQ p_ids for other subframes may be consecutive with the indicated HARQ process IDs, modulo max number of HARQ processes. DCI format 0B/4B indicates RVs for the scheduled subframes by indicating a 1-bit RV value per scheduled subframe (regardless of the number of scheduled transport blocks). In an example, DCI may indicate RV 0 or 2.

A UE may Support UL/DL Scheduling Combinations: Self-scheduling on DL and cross-carrier scheduling on UL. The UE to monitor for DCI formats scheduling PUSCH of a single eLAA Scell on one UL licensed-band scheduling cell, e.g. DCI formats 0A/0B, Formats 4A/4B (e.g. if configured for TM2). The UE may monitor for DCI formats scheduling LAA PDSCH on the LAA SCell, e.g. DCI formats 1A/1B/1D/1/2A/2/2B/2C/2D. In an example, RRC signaling may configure self-scheduling on DL and cross-carrier scheduling on UL.

DCI format 0B/4B may schedule PUSCH transmission in a single subframe. For DCI format 0B/4B, bit width of number of scheduled subframes is 1 bit when N_sf is configured as 2 and 2 bits when N_sf is configured as larger than 2. Timing offset is counted from subframe N+4+k, and k is signalled with 4 bits ([0 . . . 15] SFs) (e.g. in case of 2-step scheduling).

One of four starting symbol positions may be signaled for the first subframe in DCI formats 0A/4A/0B/4B. DCI including uplink grant may indicate the starting time for transmission on UL, e.g. a field in a DCI may indicate starting at one of the following times in a UL subframe: Start of DFTS-OFDM symbol 0, Start of DFTS-OFDM symbol 1, 25 us after start of DFTS-OFDM symbol 0, 25 us+TA value after start of DFTS-OFDM symbol 0. Extension of cyclic prefix of the next DFTS-OFDM symbol may occupy part of the first DFTS-OFDM symbol.

In an example embodiment, if a UE detects PDCCH with DCI CRC scrambled by CC-RNTI in subframe n−1 or subframe n of a LAA Scell, the UE may assume the configuration of occupied OFDM symbols in subframe n of the LAA Scell according to the 'Subframe configuration for LAA' field in the detected DCI in subframe n−1 or subframe n.

The subframe-configuration-for-LAA field indicates the configuration of occupied OFDM symbols (e.g., OFDM symbols used for transmission of downlink physical channels and/or physical signals) in current and/or next subframe e.g. according to a predefined.

If the configuration of occupied OFDM symbols for subframe n is indicated by the Subframe configuration for LAA field in both subframe n−1 and subframe n, the UE may assume that the same configuration of occupied OFDM symbols is indicated in both subframe n−1 and subframe n.

If a UE detects PDCCH with DCI CRC scrambled by CC-RNTI in subframe n, and the UE does not detect PDCCH with DCI CRC scrambled by CC-RNTI in subframe n−1, and if the number of occupied OFDM symbols for subframe n indicated by the Subframe configuration for LAA field in subframe n is less than 14, the UE may not be required to receive any other physical channels in subframe n.

If a UE does not detect PDCCH with DCI CRC scrambled by CC-RNTI containing 'Subframe Configuration for LAA' field set to other than '1110' and '1111' in subframe n and the UE does not detect PDCCH with DCI CRC scrambled by CC-RNTI containing 'Subframe Configuration for LAA' field set to other than '1110' and '1111' in subframe n−1, the UE is not required to use subframe n for updating CSI measurement.

If a serving cell is a LAA Scell, and if the higher layer parameter subframeStartPosition for the Scell indicates 's07', and if the UE detects PDCCH/EPDCCH intended for the UE starting in the second slot of a subframe, the UE may assume that OFDM symbols in the first slot of the subframe are not occupied, and OFDM symbols in the second slot of the subframe are occupied. If subframe n is a subframe in which OFDM symbols in the first slot are not occupied, the UE may assume that all the OFDM symbols are occupied in subframe n+1.

If a UE is configured with a LAA SCell for UL transmissions, and the UE detects PDCCH with DCI CRC scrambled by CC-RNTI in subframe n, the UE may be configured with a 'UL duration' and 'UL offset' for subframe n according to the Uplink-configuration-for-LAA field in the detected DCI. The uplink-configuration-for-LAA field indicates the UL duration and UL offset, e.g. according to a table. For example, value of 'UL configuration for LAA' field 00001 may indicate UL offset of 1 subframe and UL duration of 1 subframe, value of 'UL configuration for LAA' field 00010 may indicate UL offset of 1 subframe and UL duration of 2 subframes, and continue to value of 'UL configuration for LAA' field 11110 may indicate UL offset of 6 subframes and UL duration of 6 subframes.

If the 'UL configuration for LAA' field configures an 'UL offset' $l$ and an 'UL duration' $d$ for subframe n, the UE is not required to receive any downlink physical channels and/or physical signals in subframe(s) n+l+i with i=0, 1, . . . , d−1.

In an example embodiment, an eNB may transmit one or more RRC message comprising configuration parameters of a plurality of cells comprising one or more licensed cells and/or one or more unlicensed (e.g. LAA) cell. Example configuration parameters for an LAA cell may comprise MAC, and PHY layer parameters. For example, PDSCH, PUSCH, PDCCH and other downlink and uplink channel parameters. Example configuration parameters may include LBT configuration parameters, for example, maxEnergyDetectionThreshold IE may Indicate absolute maximum energy detection threshold values. For example, Value −85 to −85 dBm, and so on (e.g. in steps of 1 dB). If the field is absent, the UE may use a default maximum energy detection threshold value. For example, energyDetectionThresholdOffset IE may indicates the offset to the default maximum energy detection threshold value. For example, Value −13 to −13 dB, value −14 to −14 dB, and so on (e.g. in steps of 1 dB).

Example embodiments enhances PHY, MAC, and/RRC procedures in an eNB and/or UE and improves battery power consumption, radio spectral efficiency, and scheduling efficiency when carrier aggregation and/or dual connectivity is implemented employing unlicensed (e.g. LAA cells).

In an example, E-UTRAN may support Dual Connectivity (DC) operation whereby a multiple Rx/Tx UE in RRC_CONNECTED may be configured to utilize radio resources provided by two distinct schedulers, located in two eNBs connected via a non-ideal backhaul over the X2 interface. The overall E-UTRAN architecture may be applicable for DC as well. eNBs involved in DC for a certain UE may assume two different roles: an eNB may either act as an MeNB or as an SeNB. In DC a UE may be connected to one MeNB and one SeNB.

In an example, in DC, the radio protocol architecture that a particular bearer uses may depend on how the bearer is setup. Three bearer types may exist: MCG bearer, SCG bearer and split bearer. Those three bearer types are depicted in Figure below. RRC may be located in MeNB and SRBs are always configured as MCG bearer type and therefore only use the radio resources of the MeNB.

In an example, DC may be described as having at least one bearer configured to use radio resources provided by the SeNB.

In an example, inter-eNB control plane signaling for DC may be performed by means of X2 interface signaling. Control plane signaling towards the MME may be performed by means of S1 interface signaling.

In an example, there may be only one S1-MME connection per DC UE between the MeNB and the MME. eNB may be able to handle UEs independently, i.e. provide the PCell to some UEs while providing SCell(s) for SCG to others. Each eNB involved in DC for a certain UE may control its radio resources and may be primarily responsible for allocating radio resources of its cells. Respective coordination between MeNB and SeNB may be performed by means of X2 interface signaling.

In an example, Figure below shows C-plane connectivity of eNBs involved in DC for a certain UE: the S1-MME may be terminated in MeNB and the MeNB and the SeNB may be interconnected via X2-C.

In an example, for dual connectivity two different user plane architectures may be allowed: one in which the S1-U only terminates in the MeNB and the user plane data is transferred from MeNB to SeNB using the X2-U, and a second architecture where the S1-U may terminate in the SeNB. In an example, the Figure below shows different U-plane connectivity options of eNBs involved in DC for a certain UE.

In an example, different bearer options may be configured with different user plane architectures. U-plane connectivity may depend on the bearer option configured:

In an example, for MCG bearers, the S1-U connection for the corresponding bearer(s) to the S-GW may be terminated in the MeNB. The SeNB may not be involved in the transport of user plane data for this type of bearer(s) over the Uu.

In an example, for split bearers, the S1-U connection to the S-GW may be terminated in the MeNB. PDCP data may be transferred between the MeNB and the SeNB via X2-U. The SeNB and MeNB are involved in transmitting data of this bearer type over the Uu. In an example, for SCG bearers, the SeNB may be directly connected with the S-GW via S1-U. The MeNB may not be involved in the transport of user plane data for this type of bearer(s) over the Uu. In an example, if only MCG and split bearers are configured, there may be no S1-U termination in the SeNB. In an example, the following scenarios for Dual Connectivity involving HeNBs are supported as listed in Table below.

In an example, membership Verification for the hybrid access HeNB may be performed between the MeNB and the MME, and may be based on membership status information reported by the UE and the CSG ID.

In an example, if the cell served by the SeNB is a shared hybrid cell, the UE may report the subset of the broadcasted PLMN identities passing PLMN ID check and the CSG whitelist of the UE includes an entry comprising of the concerned PLMN identity and the CSG ID broadcast by the cell served by the SeNB. The MeNB may perform PLMN ID check for the PLMNs reported by the UE and may select one if multiple pass the PLMN ID check. If the cell served by the SeNB belongs to a different PLMN than the PLMN serving for the UE in the MeNB, the information provided to the MME for membership verification may need to contain the PLMN-ID of the hybrid cell served by the SeNB. The MME may verify the CSG membership according to the received CSG ID, the selected PLMN ID and stored subscription CSG information of the UE.

In an example, in case the UE has been admitted with SCG resources configured with the split bearer option from a hybrid HeNB and a SeNB Change may be performed within the coverage area of the MeNB towards another hybrid HeNB which has the same CSG ID as the first one, the MeNB may re-use the result of the membership verification performed for the first HeNB.

In an example, in case of DC, the UE may be configured with two MAC entities: one MAC entity for MeNB and one MAC entity for SeNB. The Example Figure below describes the layer 2 structure for the downlink when both CA and DC are configured. In order to simplify the figure, the BCH, PCH, MCH and corresponding logical channels are not included. Also, only UEn is shown as having DC configured.

The example Figure below describes the layer 2 structure for the uplink when both CA and DC are configured. In an example, SRBs may be handled by the MeNB. For a split bearer, a UE may be configured over which link (or both) the UE transmits UL PDCP PDUs by the MeNB. In an example, on the link which is not responsible for UL PDCP PDUs transmission, the RLC layer may transmit corresponding ARQ feedback for the downlink data.

In an example, in DC, the configured set of serving cells for a UE may consist of two subsets: the Master Cell Group (MCG) containing the serving cells of the MeNB, and the Secondary Cell Group (SCG) containing the serving cells of the SeNB. In an example, when a UE is configured with CA in the MCG, the carrier aggregation principles may apply to MCG.

In an example, for SCG, the following principles may be applied: at least one cell in SCG may have a configured UL CC and one of them, named PSCell, may be configured with PUCCH resources; when SCG is configured, there may always be at least one SCG bearer or one Split bearer; upon detection of a physical layer problem or a random access problem on PSCell, or the maximum number of RLC retransmissions has been reached associated with the SCG, or upon detection of an access problem on PSCell (e.g., T307 expiry) during SCG change, or when exceeding the maximum transmission timing difference between CGs, RRC connection Re-establishment procedure may not be triggered, UL transmissions towards cells of the SCG may be stopped, MeNB may be informed by the UE of SCG failure type, and/or for split bearer the DL data transfer over the MeNB may be maintained; the RLC AM bearer may be configured for the split bearer; like PCell, PSCell may not be de-activated; PSCell may be changed with SCG change (e.g., with security key change and RACH procedure); neither direct bearer type change between Split bearer and SCG bearer nor simultaneous configuration of SCG and Split bearer may be supported.

In an example, with respect to the interaction between MeNB and SeNB, the following principles may be applied: logical channel identities may be independently allocated by the MeNB and the SeNB; the MeNB may maintain the RRM measurement configuration of the UE and/or may, e.g. based on received measurement reports or traffic conditions or bearer types, decide to ask a SeNB to provide additional resources (serving cells) for a UE; upon receiving the request from the MeNB, a SeNB may create the container that may result in the configuration of additional serving cells for the UE (or decide that it has no resource available to do so); for UE capability coordination, the MeNB may provide (part of) the AS configuration and the UE capabilities to the SeNB; the MeNB and the SeNB exchange information about UE configuration by means of RRC containers (inter-node messages) may be carried in X2 messages; the SeNB may initiate a reconfiguration of its existing serving cells (e.g., PUCCH towards the SeNB); the SeNB may decide which cell is the PSCell within the SCG; the MeNB may not change the content of the RRC configuration provided by the SeNB; in the case of the SCG addition and SCG SCell addition, the MeNB may provide the latest measurement results for the SCG cell(s); and/or both MeNB and SeNB may know the SFN and subframe offset of each other by OAM or UE measurement, e.g., for the purpose of DRX alignment and identification of measurement gap.

In an example, when adding a new SCG SCell, dedicated RRC signaling may be used for sending all required system information of the cell as for CA, except for the SFN acquired from MIB of the PSCell of SCG.

In an example, for Dual Connectivity, the UE may be configured with two cell groups (CGs). A CG may include cells that are associated to the same eNB and those cells may be synchronized at the eNB level similar as for carrier aggregation. In an example, two operations may be defined: synchronous and asynchronous DC. In synchronous DC operation, the UE may cope with a maximum reception timing difference up to at least 33 µs and maximum transmission timing difference up to at least 35.21 µs between CGs. In asynchronous DC operation, the UE may cope with a maximum reception/transmission timing difference up to 500 µs between CGs.

In an example, When DC is deployed, frame timing and SFN are aligned among the component carriers to be aggregated within a CG, and may or may not be aligned between different CGs.

In an example, an LAA cell employing an unlicensed spectrum may have cell configurations different from legacy cells employing TDD and/or FDD subframe structures. An LAA cell may employ a frame structure type 3 and/or an LBT function. In legacy systems, base stations do not share their LAA cell configuration information, such as frame structure type 3 configurations, LBT functions, and/or the like, with their neighboring base stations. By sharing cell configuration information for an LAA cell, neighboring base stations may determine whether their neighbor cells are LAA cells or other type of cells, and further may be informed detailed cell configuration parameters of neighboring LAA cells. Based on the received cell configuration parameters of LAA cells, a base station may update its cell configuration parameters, for example, to be aligned with the neighboring LAA cells, not to interfere the neighboring LAA cells' operation, to cooperate with the neighboring LAA cells, to control network optimization operation (e.g. load balancing, mobility, interference, etc.), and/or the like.

In an example, based on the shared cell configuration parameters of LAA cells, a base station may make a decision of handover and/or dual connectivity initiation/modification for a wireless device. In an example, if a wireless device supports an unlicensed spectrum, a base station may positively take into account a handover/dual-connectivity of the wireless device towards its neighboring base station with LAA cells. In an example, if a wireless device does not support an unlicensed spectrum, a base station may negatively consider a handover/dual-connectivity of the wireless device towards its neighboring base station with LAA cells.

In an example, based on the shared cell configuration parameters of LAA cells, a base station may configure one or more mobility parameters towards a base station of the LAA cells. In an example, though non-LAA cells of a neighboring base station are in high load status, if the neighboring base station has an LAA cell, a base station may initiate a handover towards the neighboring base station. In an example, a base station may further transmit, to a wireless device, a measurement configuration message configured based on the shared cell configuration parameters of LAA cells. The measurement configuration message may comprise measurement configurations for the neighboring LAA cells.

In an example embodiment, an issue with respect to exchanging an unlicensed/LAA cell information between eNBs is how an eNB recognizes whether its neighbor cell supports unlicensed/LAA functions or not and/or how an eNB gets its neighbor unlicensed/LAA cell information that may be employed when the eNB decides an operation related to its neighbor unlicensed/LAA cell. In an example, an unlicensed/LAA cell uses an unlicensed spectrum to exchange packets with a wireless device. Because the unlicensed spectrum may be shared with other networks, e.g. WLAN and/or other LTE networks, an unlicensed/LAA cell may require cell configurations, e.g. using frame structure type 3 and/or LBT function, distinguished from cell configurations for conventional FDD or TDD cells. In an example, to share the unlicensed spectrum with other networks, an eNB may use an LBT (Listen Before Talk) function, in which the eNB may detect energy level from other networks on its transmission frequency before transmitting packets through the frequency. In an example, if the energy level detected is higher than a threshold, the eNB may not transmit packets.

In an example embodiment, an X2 setup request message and/or an X2 setup response message may comprise a global eNB ID, local home network identifier (LHN ID), a GU Group ID list (e.g. including all pools to which an eNB belongs), and/or Served Cells (e.g. including information of one or more serving cells) comprising a Served Cell Information and a Neighbour Information.

In an example embodiment, an eNB configuration update message may comprise Served Cells To Add (e.g. including information of cells starting operation), Served Cells to Modify (e.g. including information of one or more cells modifying operation), Served Cells to Delete (e.g. including information of one or more cells stopping operation), a GU Group Id To Add List (e.g. including a list of one or more GU Group Ids to which an eNB may belong), a GU Group Id To Delete List (e.g. including a list of one or more GU Group Ids to which an eNB may not belong anymore), and/or Coverage Modification List (e.g. including a list of one or more cells modifying coverage or inactivated and/or information of cell replacements). The list of Served Cells to Add may comprise Served Cell Information and/or a list of Neighbour Information. The list of Served Cells to Modify may comprise an old E-UTRAN cell global identifier (Old ECGI), Served Cell Information, and/or a list of Neighbour Information. The list of Served Cells to Delete may comprise an old E-UTRAN cell global identifier (Old ECGI).

In an example embodiment, the Served Cell Information of an X2 setup request/response message and/or an eNB configuration update message, may comprise at least one of: physical cell id (PCI), evolved cell global identifier (ECGI), tracking area code, broadcast PLMN (e.g. including a list of one or more PLMN Identities), number of antenna ports, PRACH configuration parameters, MBSFN subframe information (e.g. including radio frame allocation period, radio frame allocation offset, subframe allocation), closed subscriber group (CSG) identifier, MBMS service area identity list (e.g. including list of one or more MBMS Service Area Identities), multi band information list, frequency band indicator priority, and/or cell Configuration. the Served Cell Information may comprise at least one of FDD cell information, TDD cell information, and/or unlicensed/LAA cell information.

In an example, the Neighbour Information of an X2 setup request/response message and/or an eNB configuration update message may comprise evolved cell global identifier (ECGI), physical cell identifier (PCI), E-UTRA absolute radio frequency channel number (EARFCN) containing DL EARFCN for FDD or EARFCN for TDD or unlicensed/LAA cell, tracking area code (TAC), and/or EARFCN Extension containing DL EARFCN for FDD or EARFCN for TDD or unlicensed/LAA cell (if the EARFCN Extension is present, the value signaled in the EARFCN may be ignored).

In an example embodiment, an eNB may select/configure configuration parameters for its unlicensed/LAA cell and may transmit unlicensed/LAA cell information to its neighbor eNBs. In an example, the unlicensed/LAA cell information may comprise at least one of: physical cell id (PCI), evolved cell global identifier (ECGI), tracking area code, broadcast PLMN (e.g. including a list of one or more PLMN Identities), number of antenna ports, PRACH configuration parameters, MBSFN subframe information (e.g. including radio frame allocation period, radio frame allocation offset, subframe allocation), closed subscriber group (CSG) identifier, MBMS service area identity list (e.g. including list of one or more MBMS Service Area Identities), multi band information list, frequency band indicator priority, and/or cell configuration.

Cell configuration may indicate that the cell is an Unlicensed and/or LAA Cell type (e.g. using frame structure type 3). Cell configuration for an TDD or FDD cell may indicate that the cell is a TDD cell type (e.g. using frame structure type 2) or FDD cell type (e.g. using frame structure type 1). In an example, a cell may be one of FDD, TDD, or LAA cell type.

Cell configuration for an Unlicensed and/or LAA Cell may comprise EARFCN, Transmission Bandwidth, and/or unlicensed/LAA-Cell-Configuration of the unlicensed/LAA cell. The EARFCN (E-UTRA Absolute Radio Frequency Channel Number), for example, may define the carrier frequency used in the unlicensed/LAA cell. The Transmission Bandwidth, for example, may be used to indicate uplink and/or downlink transmission bandwidth expressed in units of resource blocks.

In an example, the unlicensed/LAA-Cell-Configuration may comprise subframeStartPosition (possible starting positions of transmission in the first subframe of the DL transmission burst, e.g. Value s0 means the starting position is subframe boundary, s07 means the starting position is either subframe boundary or slot boundary), laa-SCellSubframe-Config (indication of whether a corresponding subframe is allocated as MBSFN subframe or not), crossCarrierSchedulingConfigunlicensed/LAA-UL (a schedulingCellId indicated in crossCarrierSchedulingConfigunlicensed/LAA-UL may indicate which cell signals uplink grants), lbt-Config comprising maxEnergyDetectionThreshold (absolute maximum energy detection threshold values for LBT function) and/or energyDetectionThresholdOffset (offset to corresponding default maximum energy detection threshold value), pdcch-Configunlicensed/LAA (comprising information of monitoring DCI), absenceOfAnyOtherTechnology (indicating absence or presence of any other network sharing corresponding carrier), and/or soundingRS-UL-ConfigDedlicatedAperiodic (comprising SRS subframe indication), other LBT configuration parameters (e.g. one or more LBT priorities, LBT windows, LBT starting times, one or more LBT counters, and/or the like), LBT subframe configuration (e.g. subframe allocation, subframe offset, and/or subframe periodicity for LBT), maximum power transmission, and/or maximum transmission burst duration.

In an example, LBT parameters may be coordinated among base stations. One base station may be a Master eNB and another base station may be the Slave eNB. An Slave eNB may determine LBT parameters based on the parameters received from a Master eNB. In an example, LBT parameter and/or subframe coordination may reduce interference in the network. The eNBs may not compete for a channel at the same time and/or using the same configuration parameters. The probability of channel access by an eNB/UE may increase due to the coordination. In an example, one eNB and/or UE may defer LBT after an LBT interval of another eNB and/or UE. In an example, an eNBs may coordinate LBT parameters for different channel access priorities. For example, LBT (channel access) parameters for LBT priority 1 among eNBs may be coordinated. In an example, a higher priority LBT of a first eNB may be prioritized over a lower priority of another base station. This may be performed considering adjustment to LBT windows and/or LBT counters.

In an example embodiment, after receiving the unlicensed/LAA cell information of a neighbor cell from its neighbor eNB controlling the neighbor cell, an eNB may determine its further operation at least based on one or more elements of the unlicensed/LAA cell information. In an example, the eNB may configure its operation parameters (e.g. unlicensed/LAA cell configuration parameters, mobility parameters, dual connectivity parameters, load balancing parameters, interference control parameters, UE measurement configuration parameters, and/or other cell or UE control parameters) at least based on one or more elements of the unlicensed/LAA cell information.

In an example, an eNB may make a handover decision for a UE at least based on one or more elements of the unlicensed/LAA cell information received from a neighbor eNB. For example, in case that a UE needs services requiring stable data transmission rates, an eNB may avoid a handover of the UE towards a neighbor eNB using unlicensed spectrums. For example, in case that a UE does not need services requiring stable data transmission rates, an eNB may initiate a handover of the UE towards a neighbor eNB using unlicensed spectrums by sending a handover request message to the neighbor eNB. For example, even though a neighbor eNB uses unlicensed spectrums and a UE needs services requiring stable data transmission rates, an eNB may initiate a handover of the UE towards the neighbor eNB if the absenceOfAnyOtherTechnology in the unlicensed/LAA cell information received from the neighbor eNB indicates absence of any other network sharing the unlicensed spectrums, by sending a handover request message to the neighbor eNB.

In an example, an eNB may make a dual connectivity initiation/modification decision for a UE at least based on one or more elements of the unlicensed/LAA cell information received from a neighbor eNB. For example, in case that a bearer of a UE is for services requiring stable data transmission rates, an eNB may avoid offloading the bearer towards an unlicensed/LAA cell of a neighbor eNB. For example, in case that a bearer of a UE is for services not requiring stable data transmission rates, an eNB may offload the bearer towards an unlicensed/LAA cell of a neighbor eNB by sending an SeNB addition request message or an SeNB modification request message to the neighbor eNB. For example, even though a bearer of a UE is for services requiring stable data transmission rates, an eNB may offload the bearer towards an unlicensed/LAA cell of a neighbor eNB if the absenceOfAnyOtherTechnology in the unlicensed/LAA cell information received from the neighbor eNB indicates absence of any other network sharing a spectrum of the unlicensed/LAA cell, by sending an SeNB addition request message or an SeNB modification request message to the neighbor eNB.

In an example, an eNB may update mobility parameters at least based on one or more elements of the unlicensed/LAA cell information received from a neighbor eNB. For example, if the absenceOfAnyOtherTechnology in the unlicensed/LAA cell information received from a neighbor eNB indicates presence of any other network sharing a spectrum of a unlicensed/LAA cell of the neighbor eNB, an eNB may change mobility parameters to reduce handover initiations towards the neighbor eNB operating the corresponding unlicensed/LAA cell, and/or the eNB may send a mobility change request message to the neighbor eNB to notify the updated mobility parameters. For example, if the absenceOfAnyOtherTechnology in the unlicensed/LAA cell information received from a neighbor eNB indicates absence of any other network sharing a spectrum of a unlicensed/LAA cell of the neighbor eNB, an eNB may change mobility parameters to increase handover initiations towards the neighbor eNB operating the corresponding unlicensed/LAA cell, and/or the eNB may send a mobility change request message to the neighbor eNB to notify the updated mobility parameters.

In an example, the mobility parameters may comprise a3-Offset, a5-Threshold1, a5-Threshold2, hysteresis for a3 and/or a5 event, timeToTrigger for a3 and/or a5 event, filtercoefficient for a3 and/or a5 event, and/or cellIndividualOffset of a handover source cell and/or a handover target cell for a3 and/or a5 event.

In an example, an eNB may request a measurement to a UE at least based on one or more elements of the unlicensed/LAA cell information received from a neighbor eNB. For example, after receiving the unlicensed/LAA cell information from a neighbor eNB, an eNB may send, to a UE, measurement configuration parameters updated at least based on the EARFCN, the Transmission Bandwidth, and/or the unlicensed/LAA-Cell-Configuration in the unlicensed/LAA cell information. In an example, measurement configuration parameters may be conveyed via an RRCConnectionReconfiguration message or an RRCConnectionResume message.

Figure 10:
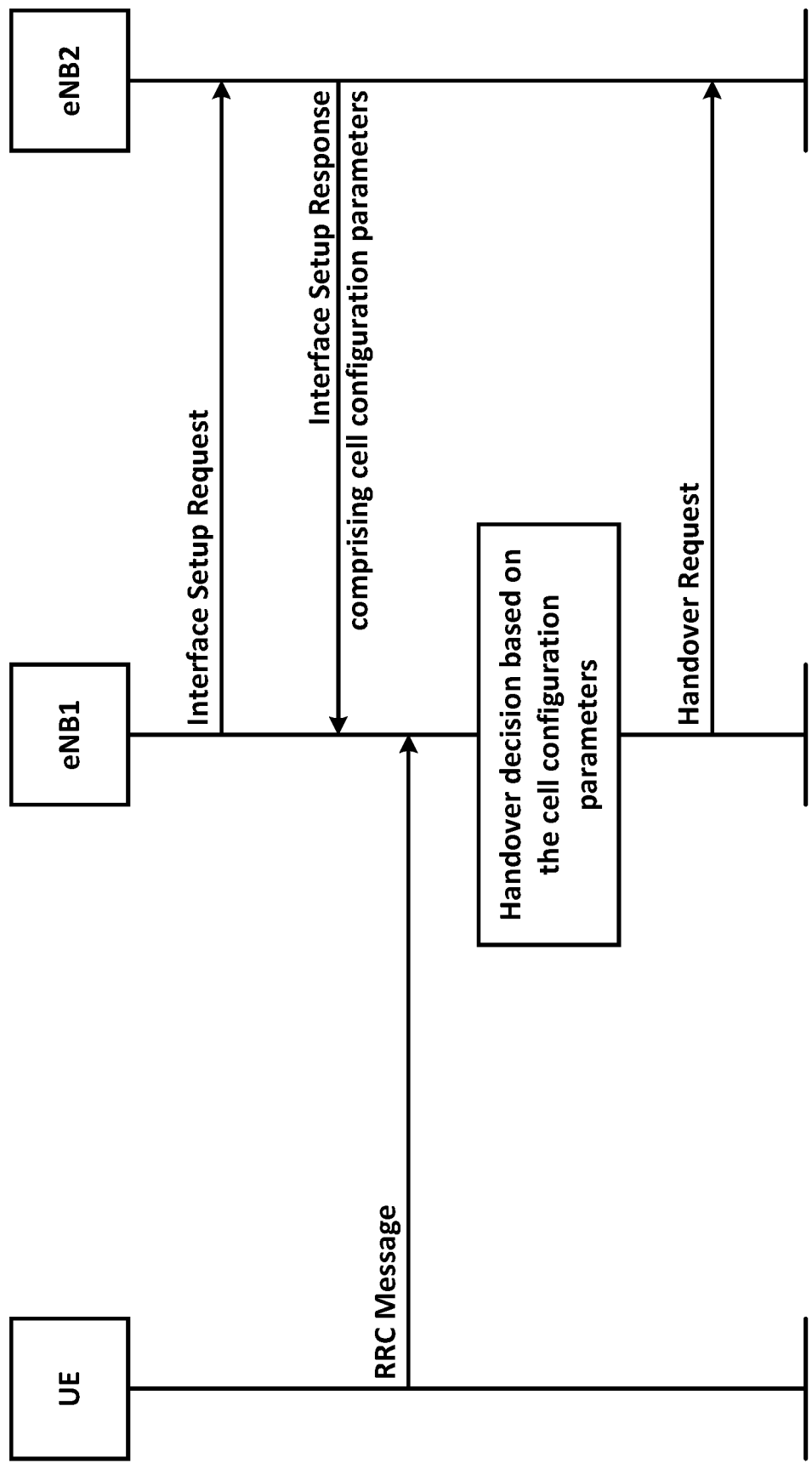
FIG. 10 is an example message flow diagram as per an aspect of an embodiment of the present disclosure.

In an example embodiment, in FIG. 10, a first eNB may transmit a first message to a second eNB. The second eNB may transmit a second message to the first eNB. The first message, for example, may be an X2 setup request message, and the second message may be an X2 setup response message, wherein the first message and the second message may be exchanged as a part of an X2 setup procedure. Through the X2 setup procedure the first eNB and/or the second eNB may exchange application level configuration data needed to interoperate over an X2 interface between the two eNBs. The first eNB may transfer a list of its served cells and/or a list of supported GU Group Ids to the second eNB via the first message. The second eNB may reply with a list of its served cells and/or a list of supported GU Group Ids in the second message. In an example, the first message and/or the second message may comprise the unlicensed/LAA cell information, wherein the unlicensed/LAA cell information may comprise the EARFCN, the Transmission Bandwidth, and/or the unlicensed/LAA-Cell-Configuration for an unlicensed/LAA cell operated by the message sending eNB. In an example, a served cell information IE in the X2 setup request message and/or the X2 setup response message may comprise the unlicensed/LAA cell information. In an example, after receiving the unlicensed/LAA cell information, the first eNB and/or the second eNB may initiate a UE handover, initiate/modify a dual connectivity of a UE, update mobility parameters, initiate a mobility setting change procedure, and/or transfer measurement configuration parameters to a UE at least based on one or more elements of the unlicensed/LAA cell information.

Figure 11:
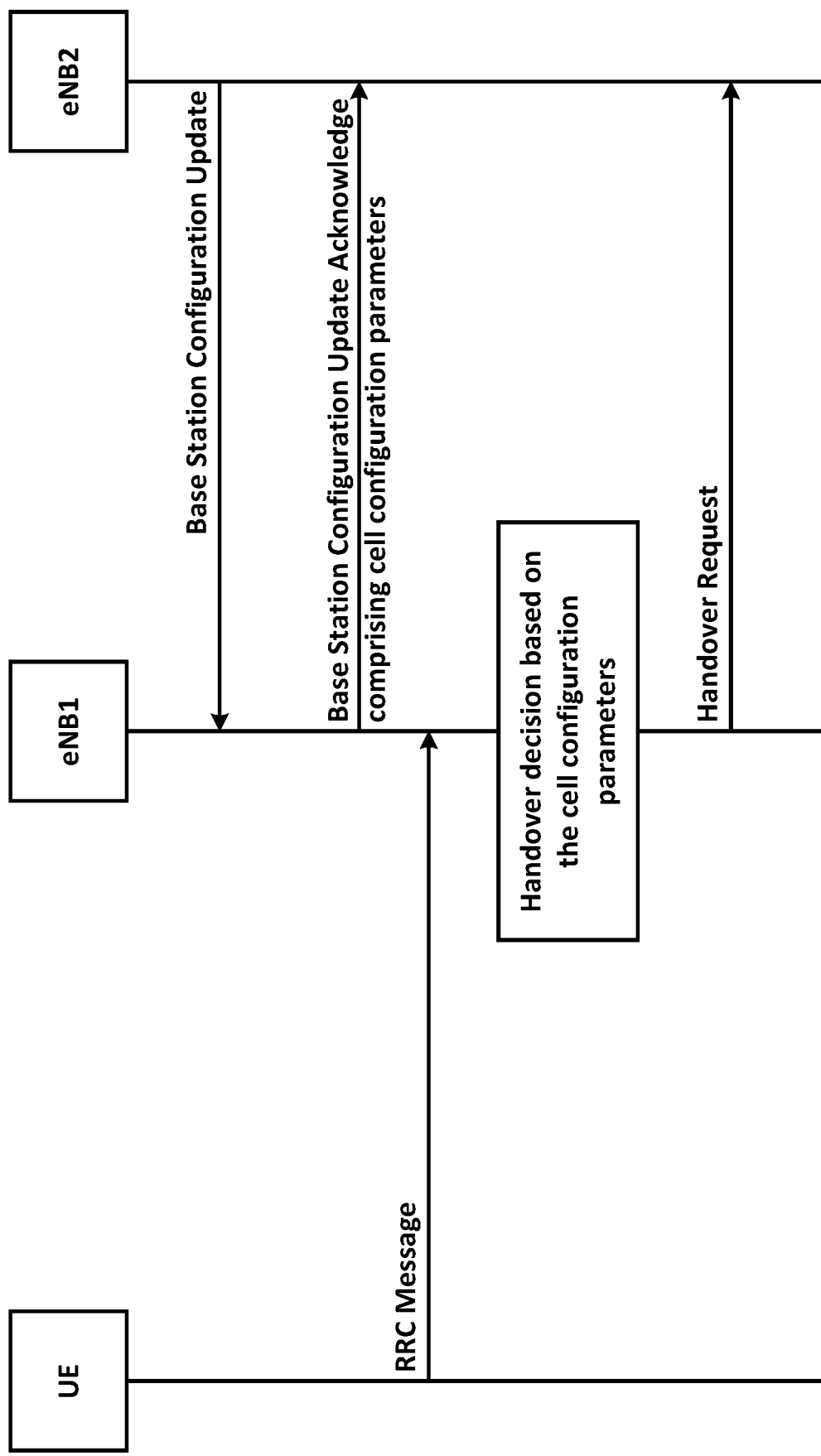
FIG. 11 is an example message flow diagram as per an aspect of an embodiment of the present disclosure.
Figure 12:
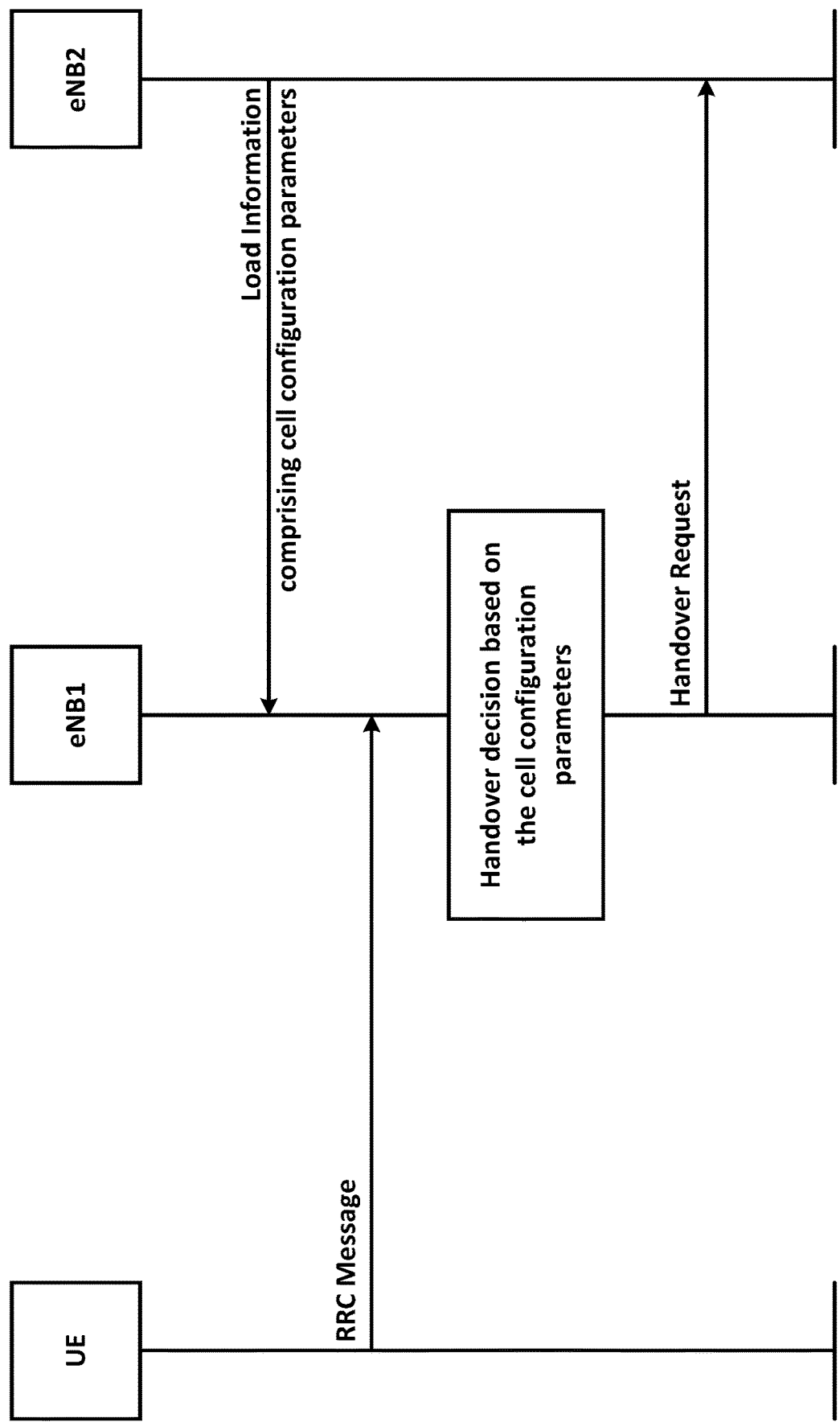
FIG. 12 is an example message flow diagram as per an aspect of an embodiment of the present disclosure.

In an example embodiment, FIG. 11, a first eNB may transmit a first message to a second eNB. The second eNB may transmit a second message to the first eNB. The first message, for example, may be an eNB configuration update message, and the second message may be an eNB configuration update acknowledge message, wherein the first message and the second message may be exchanged as a part of an eNB configuration update procedure. Through the eNB configuration update procedure, the first eNB and/or the second eNB may update application level configuration data needed to interoperate over an X2 interface between the two eNBs. The first message may comprise up-to-date configuration data, e.g. lists of added, modified, and/or deleted served cells, that the first eNB may have taken into operational use. Upon reception of the first message, the second eNB may update information for the first eNB. In an example, the first message may comprise the unlicensed/LAA cell information, wherein the unlicensed/LAA cell information may comprise the EARFCN, the Transmission Bandwidth, and/or the unlicensed/LAA-Cell-Configuration for an unlicensed/LAA cell operated by the message sending eNB. In an example, a served cell information IE in the eNB configuration update message may comprise the unlicensed/LAA cell information. In an example, after receiving the unlicensed/LAA cell information, the second eNB may initiate a UE handover, initiate/modify a dual connectivity of a UE, update mobility parameters, initiate a mobility setting change procedure, and/or transfer measurement configuration parameters to a UE at least based on one or more elements of the unlicensed/LAA cell information. In FIG. 12, the first message may be a load information message, and/or the second message may not be transmitted.

Figure 13:
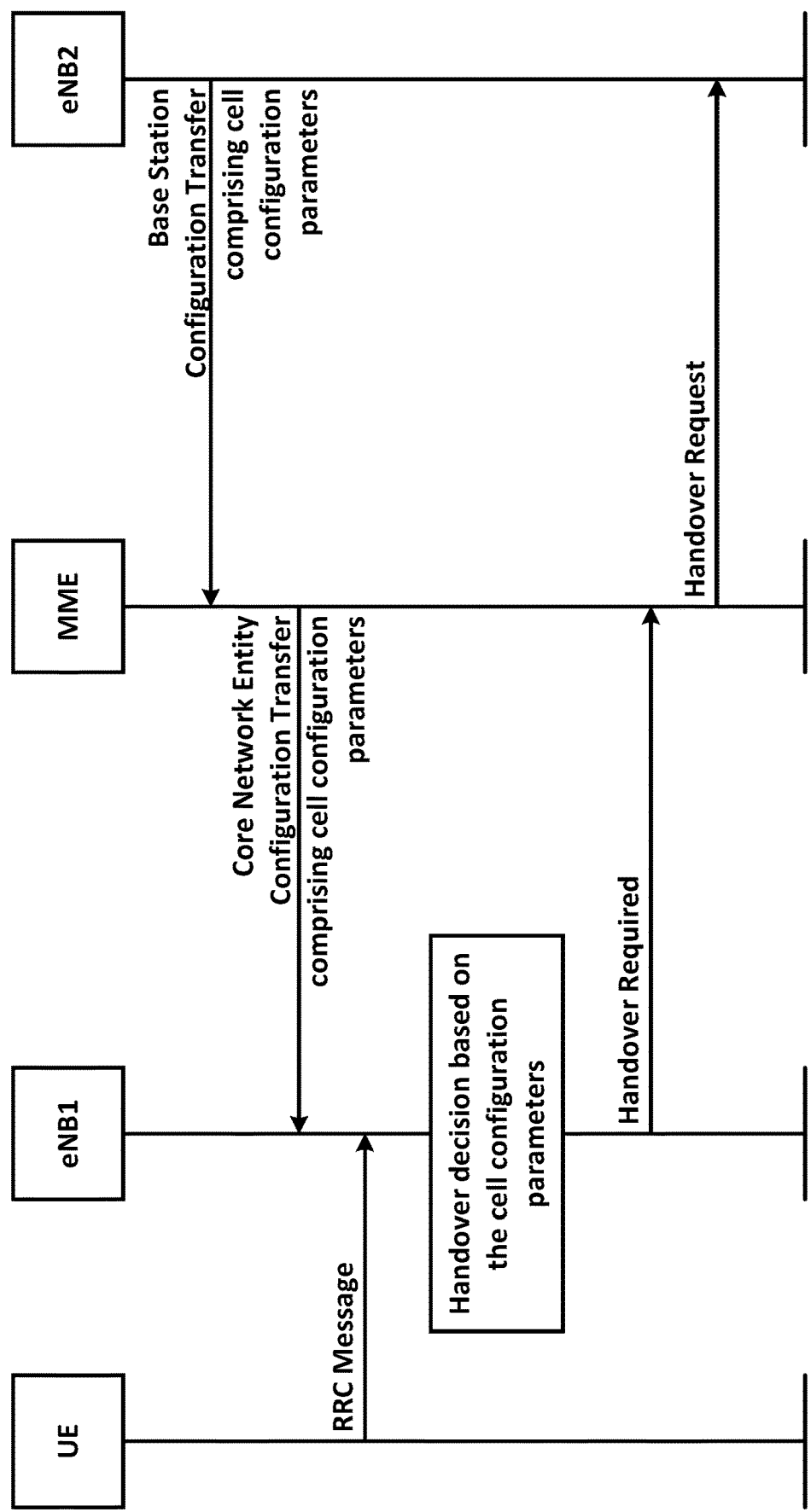
FIG. 13 is an example message flow diagram as per an aspect of an embodiment of the present disclosure.

In an example embodiment, in FIG. 13, a first eNB may transmit a first message to an MME. The MME may transmit a second message to a second eNB. The first message, for example, may be an eNB configuration transfer message, and the second message may be an MME configuration transfer message. In an example, the first message may comprise the unlicensed/LAA cell information, wherein the unlicensed/LAA cell information may comprise the EARFCN, the Transmission Bandwidth, and/or the unlicensed/LAA-Cell-Configuration for an unlicensed/LAA cell operated by the message sending eNB, and the second message may comprise one or more elements of the first message. In an example, after receiving the unlicensed/LAA cell information via the first message and the second message, the second eNB may initiate a UE handover, initiate/modify a dual connectivity of a UE, update mobility parameters, initiate a mobility setting change procedure, and/or transfer measurement configuration parameters to a UE at least based on one or more elements of the unlicensed/LAA cell information.

Figure 14:
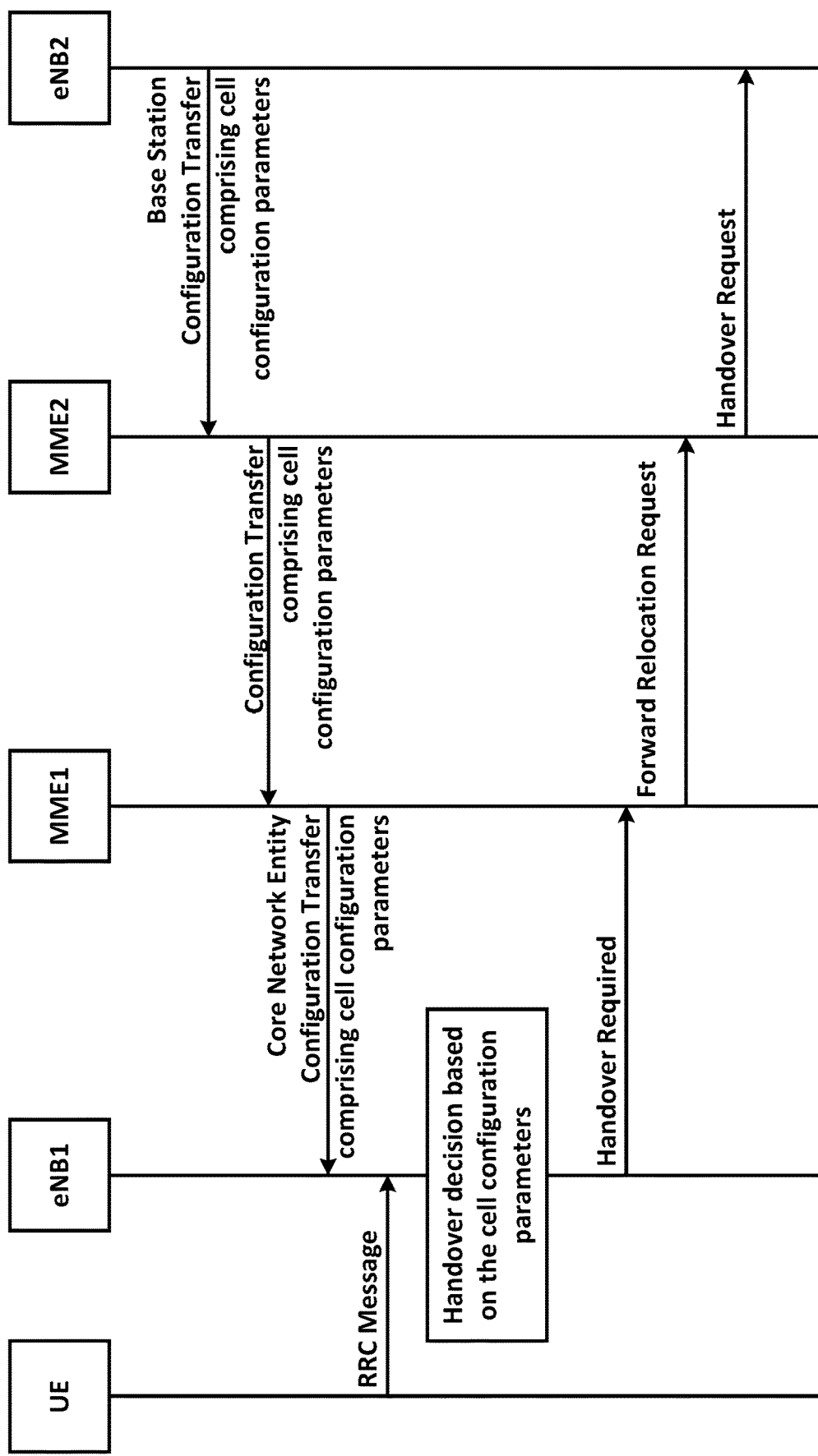
FIG. 14 is an example message flow diagram as per an aspect of an embodiment of the present disclosure.

In an example embodiment, in FIG. 14, a first eNB may transmit a first message to a first MME. The first MME may transmit a second message to a second MME. The second MME may transmit a third message to a second eNB. The first message, for example, may be an eNB configuration transfer message, the second message may be a configuration transfer tunnel message, and the third message may be an MME configuration transfer message. In an example, the first message may comprise the unlicensed/LAA cell information, wherein the unlicensed/LAA cell information may comprise the EARFCN, the Transmission Bandwidth, and/or the unlicensed/LAA-Cell-Configuration for an unlicensed/LAA cell operated by the message sending eNB, and the second message and the third message may comprise one or more elements of the first message. In an example, after receiving the unlicensed/LAA cell information via the first message, the second message, and the third message, the second eNB may initiate a UE handover, initiate/modify a dual connectivity of a UE, update mobility parameters, initiate a mobility setting change procedure, and/or transfer measurement configuration parameters to a UE at least based on one or more elements of the unlicensed/LAA cell information.

In an example, a first base station may receive, from a second base station, an application protocol message comprising: an identifier of the second base station, the second base station comprising a plurality of cells comprising one or more unlicensed/licensed-assisted-access (unlicensed/LAA) cells; information identifying a cell type for each of the one or more unlicensed/LAA cells, the cell type being unlicensed/LAA type; a cell identifier for each of the one or more unlicensed/LAA cells; and/or at least one unlicensed/LAA cell configuration parameter for each of the one or more unlicensed/LAA cells. The first base station may operates/takes at least one of the following actions based, at least in part, on information in the application protocol message: making a handover decision for a wireless device; transmitting to the second base station a second message comprising a handover request of a wireless device towards the second base station; making a dual connectivity initiation or modification decision for a bearer of a wireless device; transmitting to the second base station a second message comprising a request for a dual connectivity initiation or modification for a bearer of a wireless device towards the second base station; transmitting to the second base station a second message comprising updated mobility parameters; and/or transmitting to a wireless device measurement configuration parameters for at least one of the one or more unlicensed/LAA cells.

In an example, the at least one unlicensed/LAA cell configuration parameter may comprise at least one of: a subframeStartPosition; an laa-SCellSubframeConfig; a crossCarrierSchedulingConfigunlicensed/LAA-UL; an lbt-Config comprising one of maxEnergyDetectionThreshold or energyDetectionThresholdOffset; a pdcch-Configunlicensed/LAA; an absenceOfAnyOtherTechnology; and/or a soundingRS-UL-ConfigDedicatedAperiodic.

In an example, the second base station may further transmit packets employing the at least one unlicensed/LAA cell configuration parameter via one or more unlicensed/LAA cells. In an example, the second base station may further transmit, to a wireless device, one or more of the at least one unlicensed/LAA cell configuration parameter. The first base station may receive the application protocol message from the second base station via one or more MMEs. In an example, the receiving of the application protocol message from the second base station is performed via/employing one or more MMEs.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 15:
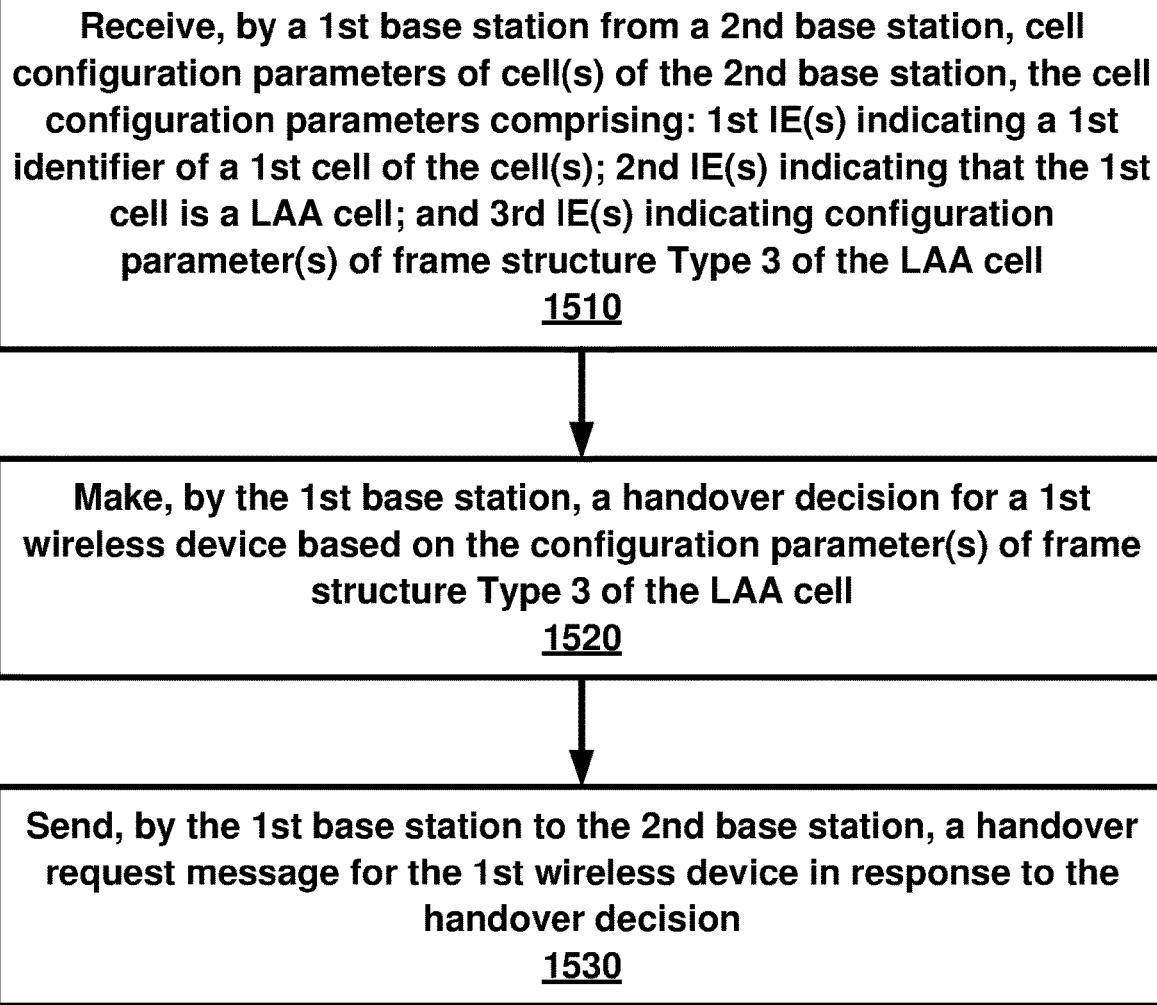
FIG. 15 is a flow diagram of an aspect of an embodiment of the present disclosure.

FIG. 15 is an example flow diagram as per an aspect of an embodiment of the present disclosure. At 1510, a first base station may receive from a second base station, cell configuration parameters of one or more cells of the second base station. The cell configuration parameters may comprise: at least one first information element (IE) indicating a first identifier of a first cell of the one or more cells; at least one second IE indicating that the first cell is a licensed assisted access (LAA) cell; and at least one third IE indicating one or more configuration parameters of frame structure Type 3 of the LAA cell. At 1520, the first base station may make a handover decision for a first wireless device based on the one or more configuration parameters of frame structure Type 3 of the LAA cell. At 1530, the first base station may send to the second base station, a handover request message for the first wireless device in response to the handover decision.

According to an embodiment, the cell configuration parameters may further comprise at least one of: at least one fourth IE indicating a downlink frequency; at least one fifth IE indicating an uplink frequency; at least one sixth IE indicating a downlink bandwidth; at least one seventh IE indicating an uplink frequency, a combination thereof, and/or the like.

According to an embodiment, the one or more configuration parameters of frame structure Type 3 of the LAA cell may indicate at least one of: an LAA cell subframe configuration; a subframe start position; a cross carrier scheduling configuration unlicensed/LAA uplink; a listen-before-talk (LBT) configuration parameter comprising at least one of a maximum energy detection threshold or an energy detection threshold offset; a physical downlink control channel (PDCCH) configuration unlicensed/LAA; a sounding reference signal uplink configuration dedicated aperiodic; an LBT procedure category comprising at least one of category 2, category 3, or category 4; a size of contention window for an LBT procedure; a hybrid automated repeat request (HARD) process number; a maximum number of scheduled subframes; a multi-antenna port transmission mode; a flexible timing support indication between uplink grant and uplink transmission, a combination thereof, and/or the like.

According to an embodiment, the first base station may further configure one or more mobility parameters towards a cell of the second base station based on the one or more configuration parameters of frame structure Type 3 of the LAA cell. According to an embodiment, the first base station may transmit to a second wireless device, measurement configuration parameters determined based on the one or more configuration parameters of frame structure Type 3 of the LAA cell. According to an embodiment, the first base station may configure cell configuration parameters of an LAA cell of the first base station based on the one or more configuration parameters of frame structure Type 3 of the LAA cell. According to an embodiment, the second base station may transmit to a third wireless device, one or more elements of the one or more configuration parameters of frame structure Type 3 of the LAA cell. The second base station may transmit through the first cell, transport blocks based on the one or more elements of the one or more configuration parameters of frame structure Type 3 of the LAA cell. According to an embodiment, the first base station may receive the cell configuration parameters from the second base station via a core network entity.

FIG. 16 is an example flow diagram as per an aspect of an embodiment of the present disclosure. At 1610, a first base station transmits to a second base station, cell configuration parameters of one or more cells of the first base station. The cell configuration parameters comprise: at least one first information element (IE) indicating a first identifier of a first cell of the one or more cells; at least one second IE indicating that the first cell is a licensed assisted access (LAA) cell; and at least one third IE indicating one or more configuration parameters of frame structure Type 3 of the LAA cell. At 1620, the first base station receives from the second base station, a handover request message for a first wireless device. The handover request message is configured based on the one or more configuration parameters of frame structure Type 3 of the LAA cell.

According to an embodiment, the cell configuration parameters may further comprise at least one of: at least one fourth IE indicating a downlink frequency; at least one fifth IE indicating an uplink frequency; at least one sixth IE indicating a downlink bandwidth; at least one seventh IE indicating an uplink frequency, a combination thereof, and/or the like. According to an embodiment, the one or more configuration parameters of frame structure Type 3 of the LAA cell may indicate at least one of: an LAA cell subframe configuration; a subframe start position; a cross carrier scheduling configuration unlicensed/LAA uplink; a listen-before-talk (LBT) configuration parameter comprising at least one of a maximum energy detection threshold or an energy detection threshold offset; a physical downlink control channel (PDCCH) configuration unlicensed/LAA; a sounding reference signal uplink configuration dedicated aperiodic; an LBT procedure category comprising at least one of category 2, category 3, or category 4; a size of contention window for LBT procedure; a hybrid automated repeat request (HARQ) process number; a maximum number of scheduled subframes; a multi-antenna port transmission mode; a flexible timing support indication between uplink grant and uplink transmission, a combination thereof, and/or the like. According to an embodiment, the second base station may configure one or more mobility parameters towards a cell of the first base station based on the one or more configuration parameters of frame structure Type 3 of the LAA cell.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments.

In this disclosure, various embodiments are disclosed. Limitations, features, and/or elements from the disclosed example embodiments may be combined to create further embodiments within the scope of the disclosure.

In this disclosure, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a first base station from a second base station, cell configuration parameters of one or more cells of the second base station, the cell configuration parameters indicating:
      at least one first information element (IE) indicating a first identifier of a first cell of the one or more cells;
      at least one second IE indicating that the first cell is an unlicensed cell; and
      at least one third IE indicating radio frequency channel number of the unlicensed cell; and
   sending, to the second base station, a handover request message for a wireless device after receiving the cell configuration parameters.

2. The method of claim 1, wherein the cell configuration parameters further indicate at least one of:
   a downlink frequency;
   an uplink frequency;
   a downlink bandwidth; or
   an uplink bandwidth.

3. The method of claim 1, wherein the cell configuration parameters further indicate at least one of:
   an unlicensed cell subframe configuration;
   a subframe start position;
   a cross carrier scheduling configuration of an unlicensed uplink;
   a physical downlink control channel (PDCCH) configuration;
   a sounding reference signal uplink configuration dedicated aperiodic;
   a hybrid automated repeat request (HARD) process number;
   a maximum number of scheduled subframes;
   a multi-antenna port transmission mode; or
   a flexible timing support indication between uplink grant and uplink transmission.

4. The method of claim 1, wherein the cell configuration parameters further indicate at least one of:
   a listen-before-talk (LBT) configuration parameter comprising at least one of:
      a maximum energy detection threshold; or
      an energy detection threshold offset;
   an LBT procedure category comprising at least one of category 2, category 3, or category 4; or
   a size of contention window for an LBT procedure.

5. The method of claim 1, further comprising configuring, by the first base station, one or more mobility parameters towards a cell of the second base station based on the cell configuration parameters.

6. The method of claim 1, further comprising transmitting, by the first base station to a second wireless device, measurement configuration parameters determined based on the cell configuration parameters.

7. The method of claim 1, further comprising configuring, by the first base station, second cell configuration parameters of a second unlicensed cell of the first base station based on the cell configuration parameters.

8. The method of claim 1, wherein the first base station receives the cell configuration parameters from the second base station via a core network entity.

9. The method of claim 1, further comprising transmitting, by the second base station to a second wireless device, one or more parameters of the cell configuration parameters.

10. The method of claim 9, further comprising transmitting, by the second base station via the unlicensed cell, transport blocks based the cell configuration parameters.

11. A first base station comprising:
    one or more processors; and
    memory storing instructions that, when executed by the one or more processors, cause the first base station to:
       receive, from a second base station, cell configuration parameters of one or more cells of the second base station, the cell configuration parameters indicating:
          at least one first information element (IE) indicating a first identifier of a first cell of the one or more cells;
          at least one second IE indicating that the first cell is an unlicensed cell; and
          at least one third IE indicating radio frequency channel number of the unlicensed cell; and
       send, to the second base station, a handover request message for a wireless device after receiving the cell configuration parameters.

12. The first base station of claim 11, wherein the cell configuration parameters further indicate at least one of:
    a downlink frequency;
    an uplink frequency;
    a downlink bandwidth; or
    an uplink bandwidth.

13. The first base station of claim 11, wherein the cell configuration parameters further indicate at least one of:
    an unlicensed cell subframe configuration;
    a subframe start position;
    a cross carrier scheduling configuration of an unlicensed uplink;
    a physical downlink control channel (PDCCH) configuration;
    a sounding reference signal uplink configuration dedicated aperiodic;
    a hybrid automated repeat request (HARD) process number;
    a maximum number of scheduled subframes;
    a multi-antenna port transmission mode; or
    a flexible timing support indication between uplink grant and uplink transmission.

14. The first base station of claim 11, wherein the cell configuration parameters further indicate at least one of:
    a listen-before-talk (LBT) configuration parameter comprising at least one of:
       a maximum energy detection threshold; or
       an energy detection threshold offset;
    an LBT procedure category comprising at least one of category 2, category 3, or category 4; or
    a size of contention window for an LBT procedure.

15. The first base station of claim 11, wherein the instructions, when executed, further cause the first base station to configure, by the first base station, one or more mobility parameters towards a cell of the second base station based on the cell configuration parameters.

16. The first base station of claim 11, wherein the instructions, when executed, further cause the first base station to transmit, by the first base station to a second wireless device, measurement configuration parameters determined based the cell configuration parameters.

17. The first base station of claim 11, wherein the instructions, when executed, further cause the first base station to configure, by the first base station, second cell configuration parameters of a second unlicensed cell of the first base station based on the cell configuration parameters.

18. The first base station of claim 11, wherein the first base station receives the cell configuration parameters from the second base station via a core network entity.

19. The first base station of claim 11, wherein the instructions, when executed, further cause the first base station to transmit, by the second base station to a third wireless device, one or more parameters of the cell configuration parameters.

20. A system comprising:
a first base station comprising:
  one or more first processors; and
  first memory storing first instructions that, when executed by the one or more first processors, cause the first base station to send cell configuration parameters of one or more cells of the first base station, the cell configuration parameters indicating:
    at least one first information element (IE) indicating a first identifier of a first cell of the one or more cells;
    at least one second IE indicating that the first cell is an unlicensed cell; and
    at least one third IE indicating radio frequency channel number of the unlicensed cell; and
a second base station comprising:
  one or more second processors; and
  second memory storing instructions that, when executed by the one or more second processors, cause the second base station to:
  receive, from the first base station, the cell configuration parameters; and
  send, to the first base station, a handover request message for a wireless device after receiving the cell configuration parameters.

* * * * *